(12) United States Patent
Varshney et al.

(10) Patent No.: US 11,087,549 B2
(45) Date of Patent: Aug. 10, 2021

(54) METHODS AND APPARATUSES FOR DYNAMIC NAVIGABLE 360 DEGREE ENVIRONMENTS

(71) Applicant: UNIVERSITY OF MARYLAND, COLLEGE PARK, College Park, MD (US)

(72) Inventors: Amitabh Varshney, Potomac, MD (US); Eric C. Lee, Washington, DC (US); Sida Li, North Bethesda, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 0 days.

(21) Appl. No.: 16/653,266

(22) Filed: Oct. 15, 2019

(65) Prior Publication Data

US 2020/0118342 A1    Apr. 16, 2020

Related U.S. Application Data

(60) Provisional application No. 62/745,771, filed on Oct. 15, 2018, provisional application No. 62/745,769, filed on Oct. 15, 2018.

(51) Int. Cl.
*G06T 19/00* (2011.01)
*G06F 3/01* (2006.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
CPC .......... G02B 27/017; G02B 2027/0138; G02B 2027/014; G06F 3/011; G06F 3/012;
(Continued)

(56) References Cited

U.S. PATENT DOCUMENTS

| 5,613,048 A | 3/1997 | Chen et al. |
| 7,292,257 B2 | 11/2007 | Kang et al. |

(Continued)

FOREIGN PATENT DOCUMENTS

FR    2931611 B1    10/2012

OTHER PUBLICATIONS

Collet, Alvaro, et al., "High-Quality Streamable Free-Viewpoint Video", ACM Transactions on Graphics (TOG), 34.4 (2015): 69, 13 pages.

(Continued)

*Primary Examiner* — Sae Won Yoon
(74) *Attorney, Agent, or Firm* — Squire Patton Boggs (US) LLP

(57) ABSTRACT

Systems, methods, apparatuses, and computer program products for creating freely explorable, dynamic and photorealistic virtual environments, reconstructing view dependent holograms in real-time, and inserting 3D virtual objects into 360 camera based navigable environment. A method, may include simultaneously capturing 360 video data and audio data from a plurality of viewpoints within a real-world environment. The method may also include preprocessing and compressing the 360 video data and the audio data into a three-dimensional representation suitable for display. The method may further include rendering a virtual environment of the real-world environment. In addition, the method may include creating a blended virtual environment by combining the captured 360 video data and the audio data with the rendered virtual environment. Further, the method may (Continued)

include displaying the blended virtual environment in a display apparatus of a user.

14 Claims, 23 Drawing Sheets

(51) Int. Cl.
| | |
|---|---|
| *G06F 3/0481* | (2013.01) |
| *G06T 13/20* | (2011.01) |
| *G06T 19/20* | (2011.01) |
| *G06T 15/20* | (2011.01) |
| *G02B 27/01* | (2006.01) |

(52) U.S. Cl.
CPC .......... *G06F 3/017* (2013.01); *G06F 3/04815* (2013.01); *G06T 13/20* (2013.01); *G06T 15/205* (2013.01); *G06T 19/20* (2013.01)

(58) Field of Classification Search
CPC ..... G06F 3/017; G06F 3/04815; G06T 13/20; G06T 15/205; G06T 17/20; G06T 19/006; G06T 19/20; H04S 7/304; H04S 2400/15; H04S 2420/11
USPC ........................................................ 345/633
See application file for complete search history.

(56) References Cited

U.S. PATENT DOCUMENTS

| | | | |
|---|---|---|---|
| 9,363,569 B1* | 6/2016 | van Hoff ............ H04N 21/4223 |
| 9,786,027 B1* | 10/2017 | Cooley .................. H04L 67/36 |
| 2008/0244648 A1 | 10/2008 | Arfvidsson et al. |
| 2012/0098925 A1 | 4/2012 | Dasher et al. |
| 2012/0264510 A1* | 10/2012 | Wigdor ................. A63F 13/533 463/31 |
| 2014/0270684 A1 | 9/2014 | Jayaram et al. |
| 2015/0110193 A1* | 4/2015 | Deng .................. H04N 19/597 375/240.16 |
| 2016/0346494 A1* | 12/2016 | Harrison ............. H04L 65/4084 |
| 2017/0171274 A1 | 6/2017 | Wang |
| 2017/0287220 A1* | 10/2017 | Khalid ............... H04N 21/6131 |
| 2017/0330365 A1* | 11/2017 | Adamov ................. H04L 67/10 |
| 2017/0345215 A1* | 11/2017 | Khedkar ............... G06F 3/0487 |
| 2017/0363949 A1* | 12/2017 | Valente ................ H04N 13/161 |
| 2018/0088886 A1* | 3/2018 | Virodov ................ G06F 1/1632 |
| 2018/0173404 A1* | 6/2018 | Smith ................... G06T 19/006 |
| 2019/0045157 A1* | 2/2019 | Venshtain ............ G06K 9/2018 |
| 2019/0180517 A1* | 6/2019 | Yamazaki .............. G09G 3/002 |
| 2019/0253638 A1 | 8/2019 | Wen et al. |

OTHER PUBLICATIONS

Debevec, Paul E., et al., "View-Dependent Texture Mapping" Modeling and rendering architecture from photographs: A hybrid geometry-and image-based approach. Proceedings of the 23rd annual conference on Computer graphics and interactive techniques. ACM, 1996, 15 pages.

Goorts, Patrik, et al., "Real-Time Video-Based View Interpolation of Soccer Events Using Depth-Selective Plane Sweeping", Hasselt University—Expertise Centre for Digital Media, Wetenschapspark 2, 3590 Diepenbeek, Belgium, 2013, 7 pages.

Hilton, Adrian, et al., "Multiple View Reconstruction of People", 3D Data Processing, Visualization and Transmission, 2004. 3DPVT 2004, Proceedings, 2nd International Symposium on IEEE, 2004, University of Surrey, Guildford, GU2 7XH, UK, 8 pages.

Casas, Dan, et al., "4D Video Textures for Interactive Character Appearance", Centre for Vision, Speech & Signal Processing, University of Surrey, United Kingdom, Eurographics 2014, Computer Graphics Forum, vol. 33, No. 2, 2014, 10 pages.

Sobral, Andrews, et al., "A Comprehensive Review of Background Subtraction Algorithms Evaluated with Synthetic and Real Videos", Computer Vision and Image Understanding 122 (2014), pp. 4-21.

Porquet, Damien, et al., "Real-Time High-Quality View-Dependent Texture Mapping using Per-Pixel Visibility", Proceedings of the 3rd International Conference on Computer Graphics and Interactive Techniques in Australasia and South East Asia, ACM, 2005, 8 pages.

Seitz, Steven M., et al., "View Morphing", Proceedings of the 23rd Annual Conference on Computer Graphics and Interactive Techniques, ACM, 1996, Department of Computer Sciences, University of Wisconsin—Madison, 10 pages.

Volino, Marco, et al., "Optimal Representation of Multi-View Video", Centre for Vision, Speech and Signal Processing, University of Surrey Guildford, UK, 2014, 12 pages.

* cited by examiner

METHODS AND APPARATUSES FOR DYNAMIC NAVIGABLE 360 DEGREE ENVIRONMENTS

CROSS-REFERENCE TO RELATED APPLICATIONS

This application claims priority from U.S. provisional patent application Nos. 62/745,769 and 62/745,771 both filed on Oct. 15, 2018. The contents of these earlier filed applications are hereby incorporated by reference in their entirety.

FIELD

Some example embodiments may generally relate to dynamic navigable 360 degree environments. For example, certain example embodiments may relate to apparatuses, systems, and/or methods for creating freely explorable, dynamic and photorealistic virtual environments, reconstructing view dependent holograms in real-time, and inserting 3D virtual objects into a 360 degree camera based navigable environments.

BACKGROUND

Computer generated virtual environments may be freely navigable by a user, but lack photorealism and cannot capture real environments. Attempts at approaching photorealism using computer graphics rendering often come at an enormous computational cost. On the other hand, 360 degree videos may be very photorealistic, and may capture real world environments. However, then 360 degree videos may restrict a user to the location of capture. Additionally, potential advancements in 6 degrees of freedom (DOF) 360 degree videos may enable users to move around in a small captured volume, and slightly peek around the static capture points. However as soon as they move out of the small capture bubble, no additional views can be displayed. Further, photogrammetry may create freely navigable virtual reconstruction of real world environments, but is limited to representing static scenes with no dynamic contents. Thus, there may be a need to provide a system that utilizes multiple 360 degree videos to create a photorealistic real environment which is dynamic and also navigable by a user.

Additionally, video 3D reconstruction has been widely researched in academia; however due to hardware limitations, the technology has not departed far from research labs. Recently volumetric capture systems started to emerge with the development of mixed reality platforms. Although powerful workstations may generate state-of-the-art visual effects and renderings, they are still far from photorealistic quality. Thus, there may be a need for cinematic quality 3D assets. Existing volumetric capture systems may use multiple camera arrays to capture a volume from all directions. Then computer vision preprocessing may convert the captured video frames into compact meshes and textures. Further, the converted assets may be imported into rendering pipelines.

The mesh-based implementations may be integrated into existing rendering software. However, as mesh connectivity changes from frame to frame, a short playback video may amount to large quantity of data. Additionally, data compression may become a large bottleneck. This bottleneck may put a limit on the number of assets that can be rendered and the quality of each asset. Efforts such as mesh simplification and keyframe meshing have alleviated the issue. However, a fundamental flaw of mesh-based implementations is that a substantial portion of the mesh data is not used during rendering from a given viewer's perspective. A simple culling of non-visible mesh data before rendering may result in bandwidth reduction of roughly 50%. However, culling may be done in the rendering stage after the entirety of the mesh data has been transmitted and uploaded to a graphics processing unit (GPU).

360 degree cameras may include multi-camera arrays consisting of multiple single cameras arranged in an inside looking out configuration. The lenses may be wide-angle lenses that are arranged in a circular spherical configuration. Their views may have overlaps and cover the entire 360 degree field of view around the camera array. Using footage captured from these cameras, a 360 degree panoramic image or video can be produced that offers an immersive experience on virtual reality platforms.

High quality 360 degree content may be a way of reproducing photorealistic environment. The 360 degrees complete immersion also adds to the authentic feel of the environment. The realistic contents may be used in virtual reality (VR) tourism, sports events, concerts, as well as VR training. However, one limitation prevents this type of medium from being more than a passive viewing experience, and that is the inability to add interactivity. Due to the nature of the footage that was captured, 360 degree content can only be viewed from the viewpoint they are captured, and they cannot provide real-time interactivity.

SUMMARY

One embodiment may be directed to a method. The method may include simultaneously capturing 360 video data and audio data from a plurality of viewpoints within a real-world environment. The method may also include preprocessing and compressing the 360 video data and the audio data into a three-dimensional representation suitable for display. The method may further include rendering a virtual environment of the real-world environment. The method may also include creating a blended virtual environment by combining the captured 360 video data and the audio data with the rendered virtual environment. The method may further include displaying the blended virtual environment in a display apparatus of a user.

In accordance with another example embodiment, an apparatus may include at least one processor and at least one memory including computer program code. The at least one memory and the computer program code may be configured to, with the at least one processor, cause the apparatus at least to simultaneously capture 360 video data and audio data from a plurality of viewpoints within a real-world environment. The apparatus may also be caused to preprocess and compress the 360 video data and the audio data into a three-dimensional representation suitable for display. The apparatus may further be caused to render a virtual environment of the real-world environment. In addition, the apparatus may be caused to create a blended virtual environment by combining the captured 360 video data and the audio data with the rendered virtual environment. The apparatus may also be caused to display the blended virtual environment in a display apparatus of a user.

In accordance with a further example embodiment, a computer program, embodied on a non-transitory computer readable medium, the computer program, when executed by a processor, may cause a processor to simultaneously capture 360 video data and audio data from a plurality of viewpoints within a real-world environment. The processor may also be caused to preprocess and compress the 360 video data and the audio data into a three-dimensional representation suitable for display. The processor may further be caused to render a virtual environment of the real-world environment. In addition, the processor may be caused to create a blended virtual environment by combining the captured 360 video data and the audio data with the rendered virtual environment. The processor may also be caused to display the blended virtual environment in a display apparatus of a user.

BRIEF DESCRIPTION OF THE DRAWINGS

For proper understanding of example embodiments, reference should be made to the accompanying drawings, wherein.

DETAILED DESCRIPTION

Figure 1:
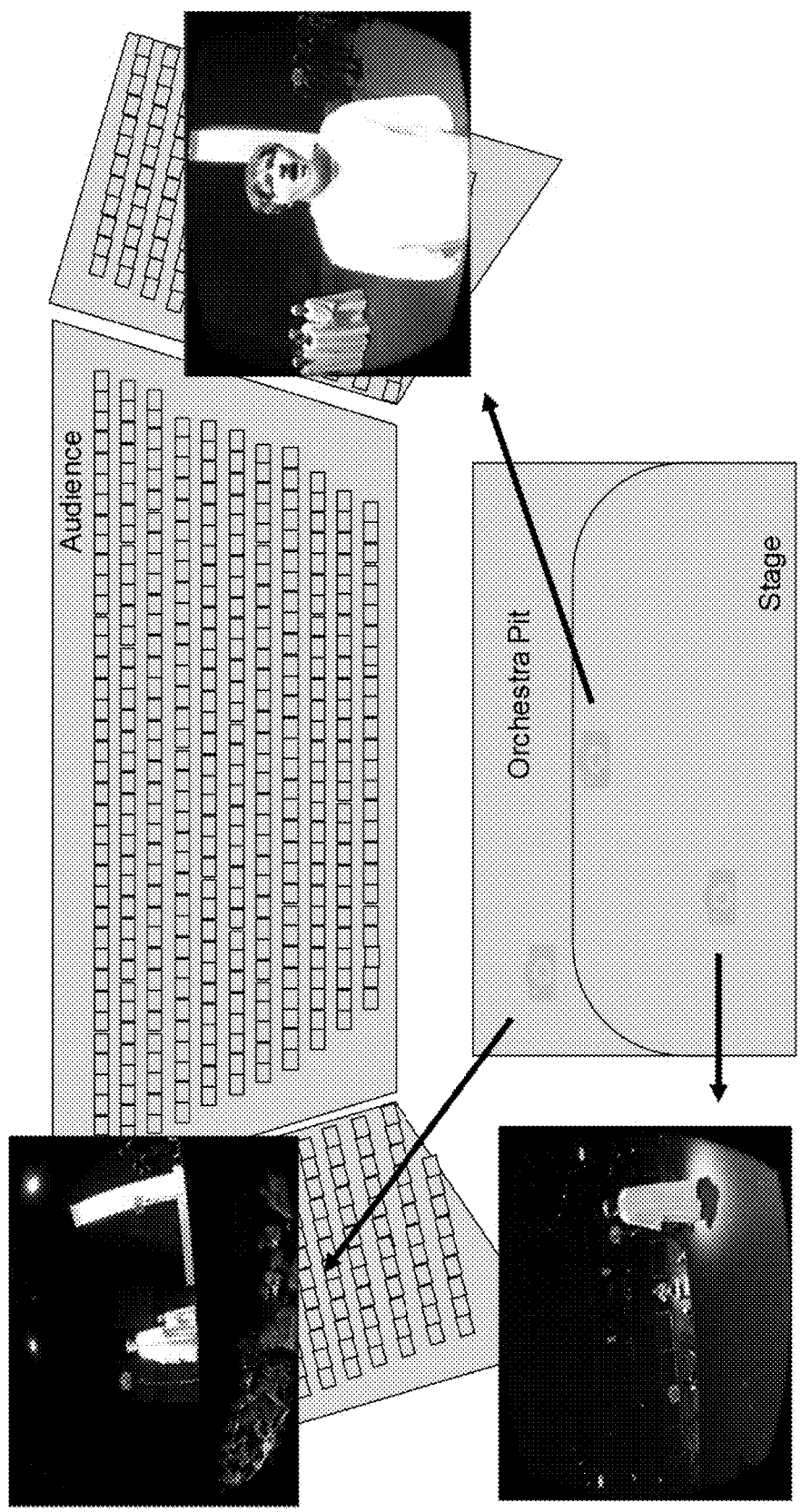
FIG. 1 illustrates multiple 360 degree video cameras in an environment, according to an example embodiment.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for creating freely explorable, dynamic and photorealistic virtual environments, reconstructing view dependent holograms in real-time, and inserting 3D virtual objects into 360 degree camera based navigable environments.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments. Further, use of "360" throughout this specification may refer to "360 degree" or "360 degrees." For example, "360 degree camera."

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Certain example embodiments may provide a system that may simultaneously capture 360 video data from multiple viewpoints within a real-world environment. According to certain example embodiments, the system may be made up of various hardware components including, for example, a 360 degree camera that may be in the form of multiple inside looking out camera array(s). The system may also include a spatial audio recorder, which may include microphones capable of recording ambisonic audio. The system may further include a personal computer with a high-end GPU. In addition, the system may include one or more virtual reality (VR) headsets. In another example embodiment the system may execute software that implements the methods/procedures described herein (e.g., playback of the 360 degree environments). In other example embodiments, the system may be designed for general computing hardware and may be used to implement software for any incarnations of general computing hardware such as desktop PC, mobile phone, VR headset, and other types of computing devices.

In an example embodiment, this may include simultaneously capturing spatial audio data from multiple viewpoints within a real-world environment. In another example embodiment, both video and audio data may be preprocessed and compressed into a format, and displayed to a user in the form of a navigable 360-degree video and audio recording of the real-world environment. According to an example embodiment, users may teleport between viewpoints to view a 360 video and audio recording of the environment from a different perspective.

In certain example embodiments, time may progress universally across all viewpoints, creating a single unified environment when viewed by a user. This may be achieved with comparable computing costs to a conventional single 360 video and audio player, regardless of the number of viewpoints in the environment. In an example embodiment, the 360 video and audio recording pairs may be recorded simultaneously from different viewpoints within the same real-world environment. In another example embodiment, a device agnostic setup device may be provided, and any 360 video recording device and spatial audio recording device may be used. Furthermore, the 360 video recordings may be either monoscopic or stereoscopic.

According to certain example embodiments, once the individual 360 video and spatial audio files are recorded, they may be converted to a format that allows for low computational cost rendering and low latency teleportation. In addition, the 360 videos may be processed and encoded using matching parameters such as frame resolution and coding format. This may allow the system to switch between an arbitrary number of 360 videos with little more overhead than a single 360 video. In another example embodiment, 360 video files may be encoded using video coding formats such as H264 or high efficiency video coding (HEVC). In other example embodiments, parameters may be constrained during encoding such as keyframe interval and forbid B-frames to facilitate low latency seeking to allow instantaneous teleportation between viewpoints. Another example embodiment may encode spatial audio recordings into B-format that enables real-time calculation of the correct audio signal to playback to the user. Furthermore, each recording's encoded bitstream may then be mapped into a single multimedia container file which a playback software may use to playback the recording. According to certain example embodiments, this may reduce the disk access and memory overhead when parsing multiple compressed bitstreams.

In certain example embodiments, the above-described unique set of constraints may be exploited by a playback scheme to support any number of viewpoints with seamless teleportation between these viewpoints while delivering convincing cinematic quality experience at reasonable computing cost. According to an example embodiment, metadata may include the set of possible destination viewpoints that can be teleported to from each viewpoint. This may correspond to, for example, destination viewpoints which may be visible in the 360 video recording. In other example embodiments, metadata containing synchronization timestamps within each 360 video and audio recording may be included as well, if recordings were not synchronized during processing. Metadata may also include information about user interface (UI) elements to be rendered over the currently displayed 360 video. This metadata may also be stored in the multimedia file as a side data stream.

According to certain example embodiments, the playback software may run on a desktop PC, mobile phone, virtual reality headset, or any other form of personal computing device. The playback software may take a scene file and use it to present a photorealistic navigable virtual environment to a user. Additionally, the metadata containing the possible destination viewpoints and UI elements may be parsed to allow appropriate interactive UI elements to be displayed at each viewpoint. The playback software may also start a decoding loop. In an example embodiment, packets from the 360 video and audio bitstream for the currently displayed viewpoint may be decoded into a sequence of image frames and audio samples. Once the appropriate time has been reached, these image frames and audio samples may be presented to the user to recreate the appearance and sound of the real world location from a given viewpoint at a given orientation. In an example embodiment, the user may control this orientation through input such as a mouse or rotation of inertia sensors in a phone or virtual reality (VR) headset.

According to an example embodiment, the playback software may display UI elements indicating possible teleport viewpoints (based on the metadata). Once a teleport is selected, the currently selected viewpoint may be changed, and the new 360 video and audio bitstreams may be fed into the decoder. According to another example embodiment, a single decoder may be used in the playback software for all video bitstreams, keeping the memory overhead required constant, regardless of the number of videos. In a further example embodiment, a single multimedia container demultiplexer may be used with the playback software for all bitstream, meaning playback progress may be universal across all bitstreams, and no complex seeking logic is required.

According to certain example embodiments, a volumetric capture playback system may be provided. In an example embodiment, the volumetric capture playback system may use view dependent image and depth textures of a subset of captured data to reconstruct the captured volume in real-time. According to an example embodiment, video compression techniques may be utilized to compress video textures and corresponding depth maps from multiple camera views. According to another example embodiment, a smaller subset of camera views may be used to reconstruct the 3D geometry. As such, certain example embodiments may deliver comparable quality without any loss of detail due to simplification of a reconstructed mesh or subsampling of textures. Since certain example embodiments may implement volumetric rendering techniques that use the closest camera views' information, the rendered textures may preserve view dependent information such as view specific lighting. Certain example embodiments may also provide a way of supporting volumetric capture live-streaming, since the data needed to be transferred may be constant regardless of number of viewpoints at the capture location.

FIG. 1 illustrates multiple 360 video cameras in an environment, according to an example embodiment. For example, FIG. 1 illustrates multiple 360 video cameras that may capture the same environment from different locations. As described herein, certain example embodiments may synchronize videos to allow users to view the same scene from multiple viewpoints at the same progress time. In addition, according to other example embodiments, UI elements may allow the user to teleport between locations when selected.

In certain example embodiments, and as illustrated in FIG. 1, multiple 360 video recording devices and 360 audio recording devices may be placed in a real world environment. For example, in one embodiment, one 360 video recording device and one 360 audio recording device per location may be used. In addition, there may be a 360 video recording device at a location without a 360 audio recording device. However, in certain example embodiments, there may be no limit to the number of 360 video and audio recording devices placed within a real world environment.

According to certain example embodiments, a 360 video recording device may include multiple 2D video recording devices. In one example embodiment, views of the 2D recording devices may have a view configuration to cover the entire panoramic view of the environment. According to other example embodiments, an audio recording device may include any device that contains at least one microphone and can store an audio recording of the microphone in a memory location. For spatial audio recording, the microphones may be arranged to capture audio from multiple directions. In certain example embodiments, both the 360 video recording device and the audio recording device may or may not store information about their relative orientations in the scene. The relative orientation information can aid in proper alignment of the video and audio. According to an example embodiment, if teleportation is desired, the 360 video recording devices and audio recording devices may be set to record at roughly the same time, and set to stop recording at roughly the same time so that there is an interval of time in which every device is recording the scene.

Figure 2A:
FIG. 2(A) illustrates a full 360 degree video frame, according to an example embodiment.
Figure 2B:
FIG. 2(B) illustrates a zoomed in image of the highlighted region in FIG. 2(A), according to an example embodiment.

FIG. 2(A) illustrates an example of a full 360 video frame, according to an example embodiment. In particular, FIG. 2(A) illustrates a full 360 video frame with a highlighted region. Further, FIG. 2(B) illustrates an example of a zoomed in image of the highlighted region in FIG. 2(A), according to an example embodiment. According to certain example embodiments, 360 cameras may include multiple camera lenses placed in a spherical configuration to have full coverage of the recorded environment. As such, proper video stitching may be implemented to convert individual recordings of different regions of the environment into a single 360 video recording. In one example embodiment, the stitching process may include finding and merging matching regions between camera frames and re-projecting them onto a spherical canvas. Then the spherical canvas may be projected into rectangular format frame(s) for encoding.

In certain example embodiments, each video may be encoded into a compressed video stream using certain video coding formats. According to certain example embodiments, these formats may be based on three types of frames: intra-coded frames in which all information needed to reconstruct the original frame may be self-contained within the frame; predicted frames where decoding may rely on information from previous frames; and bidirectional predicted frames, which may rely on information from both previous and future frames. Since predicted and bidirectional predicted frames may rely on information in other frames, the decoder may decode multiple frames before the picture can be reconstructed and displayed. This may cause a latent period between when the user requested to teleport to a new viewpoint, and when the first picture from the new viewpoint is displayed. To minimize this latency, certain example embodiments may introduce constraints on encoding parameters during encoding.

First, the use of bidirectional predicted frames may be prohibited all together so that the decoder will not have to process frames from before and past the current progress point to decode a picture. Second, a restriction may be set on which specific intra-coded frames that a predicted frame may rely on for decoding. In a video bitstream of one example embodiment, a predicted frame in the bitstream cannot use information from any intra-coded frame other than the nearest previous intra-coded frame in the bitstream. Finally, the interval of successive predicted frames may be restricted between intra-coded frames that are allowed at any point in the bitstream (group of pictures (GOP) size). This puts a ceiling on the latency when switching, which may be the time taken to decode the number of frames in the given interval. An interval of 0 is not used in certain example embodiments because intra-coded frame compression is often much less efficient than predicted frame compression. According to an example embodiment, to achieve a good balance between data size and latency, the interval may be set to a value where seeking latency is not noticeable to the user. Knowing that any bitstream the decoder processes has these constraints allows the system in certain example embodiments to decode from a random point in a bitstream with non perceivable latency.

Certain example embodiments may provide a format for storing multiple 360 video and audio recordings for playback. Standard multimedia container formats (for example MP4) can hold multiple separate compressed or uncompressed bitstreams. According to an example embodiment, during the decoding process, packets from this file may be read and sorted by the separate streams they belong to (demultiplexing or demuxing). In this procedure, each packet may be sent to the appropriate decoder for that stream type (for example, video or audio), which may then uncompress the packet. In certain example embodiments, this multistream functionality (originally meant to store video, audio, and subtitles for a single conventional video) may be used to reduce the complexity and cost of playback in the system.

Figure 3:
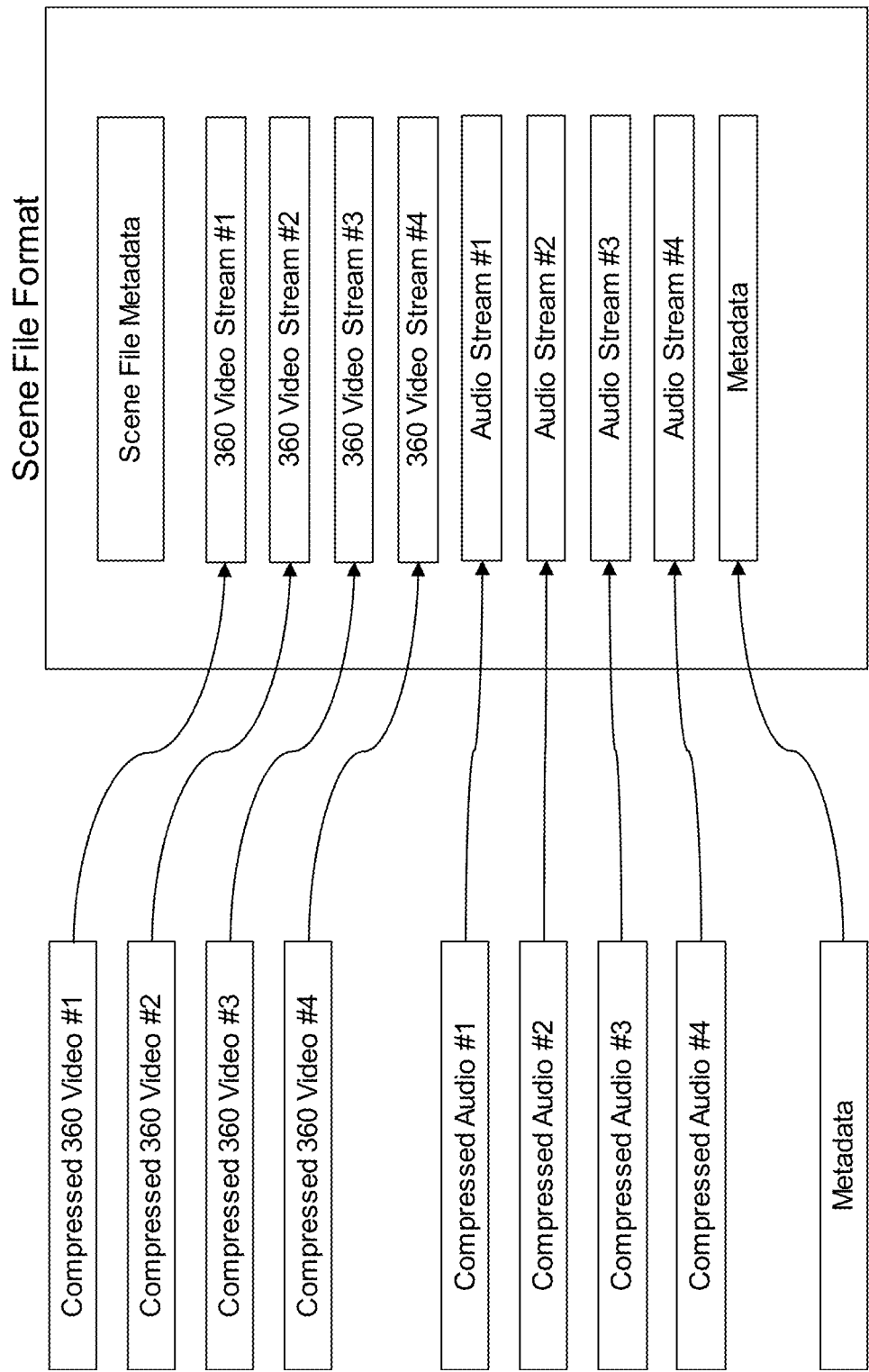
FIG. 3 illustrates a scene file format, according to an example embodiment.

FIG. 3 illustrates a scene file format, according to an example embodiment. For instance, as illustrated in FIG. 3, the scene file format may encode multiple video, audio, and metadata streams into one file. According to certain example embodiments, individual video and audio recording files from each location may be consolidated into a single multimedia container file (e.g., scene file) as individual bitstreams along with the metadata. The scene file may include all necessary information for our system to playback a navigable multi-viewpoint 360 video and audio recording of a scene. By storing all video and audio recordings and metadata in a single multimedia file as separate streams, the amount of file objects that must be opened for reading during playback may be reduced. This may also reduce the amount of file operation overhead when scaling to more viewpoints. In certain example embodiments, "file" means overall container structure. However, the scene "file" may be split into multiple smaller individual file segments on disk or memory if advantageous. For instance, if a user is to start playback of a scene from the middle of the recording, reading may start from the appropriate file segment as opposed to reading a single file and seeking to the middle.

In certain example embodiments, certain constraints may be specified on the data that can be exploited during playback to reduce the cost of decoding and teleporting amongst different viewpoints. One of these constraints is that key characteristics of the video and encoded bitstream must be consistent across all videos. This allows the playback software to decode any video bitstream included in the scene file using a single decoder, regardless of the number of video bitstreams. To enforce this constraint, certain example embodiments may require that any video data recording that has different properties than the others be reprocessed so that it is consistent. This may include video manipulation such as resizing video frames and/or video re-encoding to different video coding formats.

According to certain example embodiments, two additional constraints may include that all videos must have the same vertical and horizontal resolution, and that all videos be encoded using the same video coding format (such as H.264 or HEVC). In certain example embodiments, this consistency requirement may be enforced on all videos within the same scene file. According to certain example embodiments, it may be advantageous to have multiple sets of scene files with different encoding characteristics (such as image resolution) produced from the same source recordings. For example, in an Internet streaming case, if the bandwidth of the network degrades during playback, the system may want to switch to a scene file with lower bitrate bitstreams to continue smooth playback. In this case, bitstreams across different scene files may not be bound by data consistency rules stated above. However, if a different scene file is used during playback, the playback software may reinitialize the decoder to allow processing of a different bitstream, causing a brief period of higher latency.

In certain example embodiments, the system may use ambisonic audio to deliver spatial audio matching the user's view direction. At the time of recording, the multi-channel microphone may sample the audio in the environment from multiple directions, then the audio recording may be encoded into speaker-independent representation of a sound field called B-format. For setup, an example embodiment may use a B-format that comprises 4 audio channels: W for the sound pressure; X for the front-minus-back sound pressure gradient; Y for left-minus-right; and Z for up-minus-down. This ambisonic audio format with 4 directional components is called first-order ambisonics. As the number of directional microphones are added, higher level ambisonics may provide better spatial audio resolution. Using these channels, certain example embodiments can calculate and simulate directional audio at the location of recording. Thus, the spatial audio may match the visuals in the 360 video as the user turns to a different viewing direction.

Figure 4:
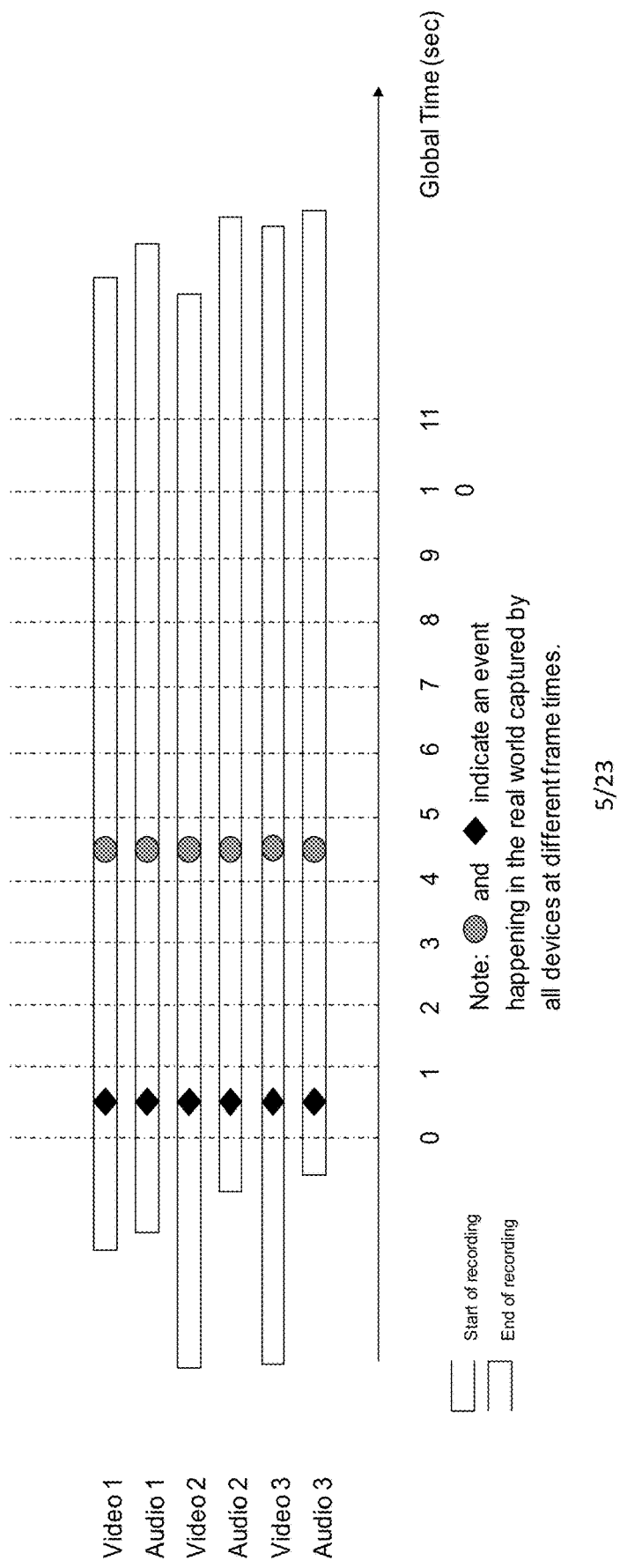
FIG. 4 illustrates synchronized recordings, according to an example embodiment.
Figure 5:
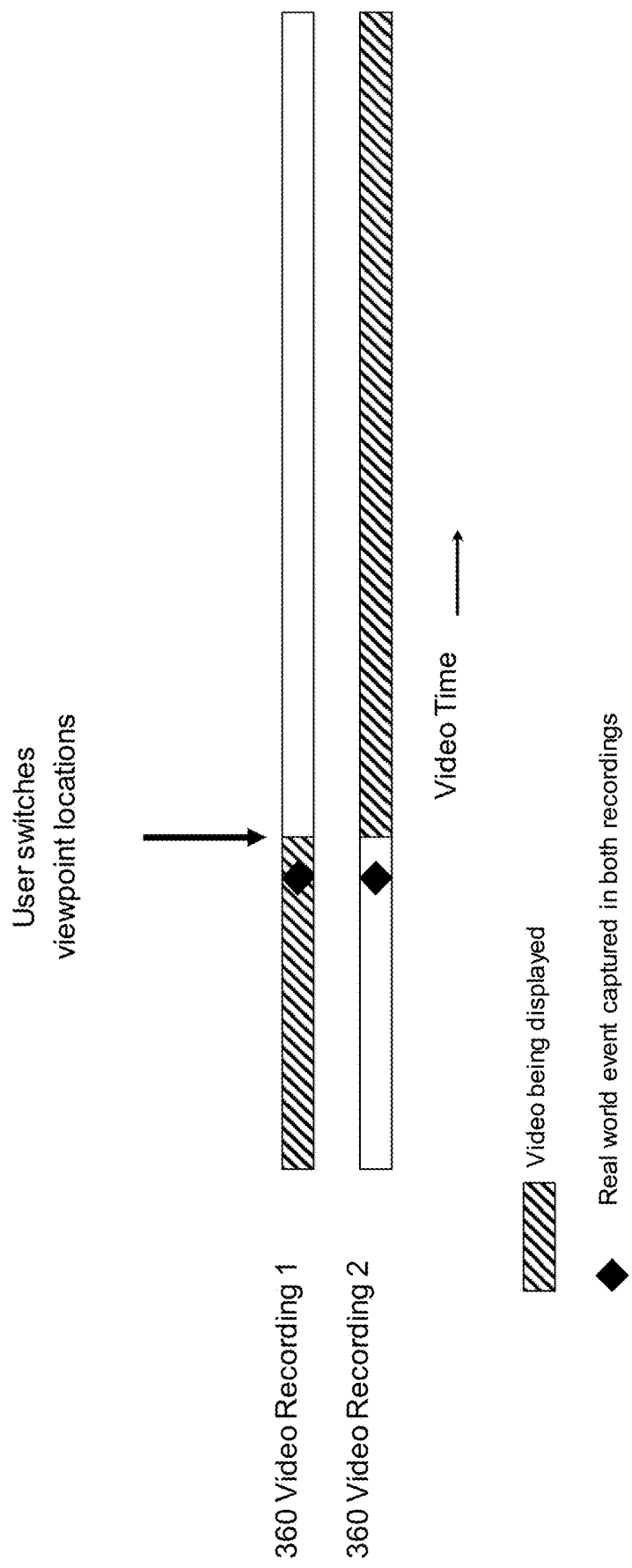
FIG. 5 illustrates switching with time-aligned videos, according to an example embodiment.

FIG. 4 illustrates synchronized recordings, according to an example embodiment. For instance, FIG. 4 illustrates the recordings that are synchronized so that the same progress time amongst the recordings contains data captured from the same real world time during the recording process. Further, FIG. 5 illustrates switching with time-aligned videos, according to an example embodiment. For instance, different video recordings may be displayed to the user when the user switches viewpoint locations. According to certain example embodiments, the 360 video and audio recordings may be aligned for synchronization (e.g., FIGS. 4 and 5). The synchronization illustrated in FIG. 4 may occur by cutting each video and audio recording so that the first frame or sample of each recording contains data of a synchronization point in the scene. In one example embodiment, cutting may occur in the same step as video encoding to avoid redundant processing. In one example embodiment, if it is desired that each video and audio recording is preserved in its entirety, synchronization may also happen by creating and storing a timestamp in the metadata for each recording. These timestamps may mark the progress in the recordings that contain synchronization points in the scene. These timestamps may then be read by the playback software and used to offset the progress time when rendering video and audio, and to seek to the correct bitstream positions when navigating amongst viewpoints. According to an example embodiment, the synchronization point may be any event that can be clearly identified in all recordings. For example, this may be an event that has both a clear audio signature and a clear visual signature so that it can be identified in both video recordings and audio recordings (e.g., the closing of a clapboard).

Figure 6:
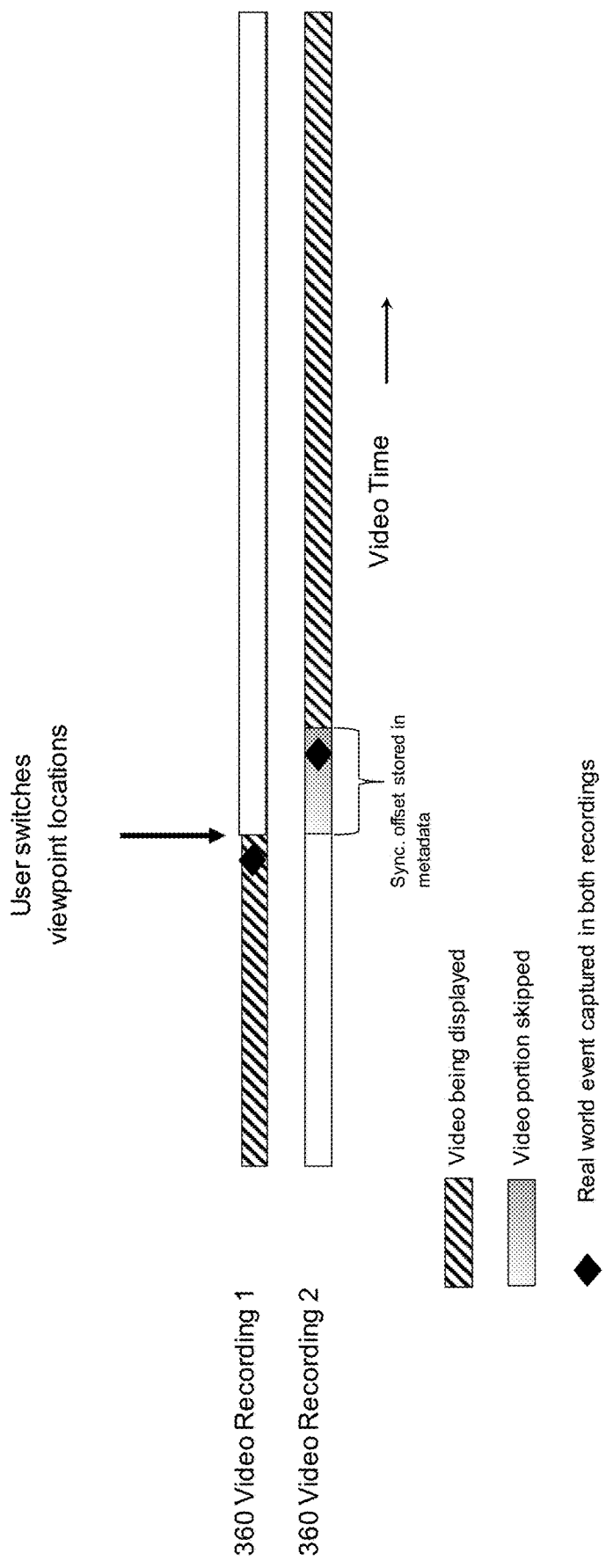
FIG. 6 illustrates switching with synchronization metadata, according to an example embodiment.

FIG. 6 illustrates switching with synchronization metadata, according to an example embodiment. For instance, FIG. 6 illustrates different video recordings that may be displayed to the user when the user switches viewpoint locations. According to certain example embodiments, metadata may be generated manually by the designer of the recording, and the metadata may convey additional information about the scene to the playback software. In one example embodiment, the information may include synchronization timestamps as mentioned herein, and information about the available teleport destinations at each viewpoint. It may also include UI elements to be displayed over the currently displayed 360 video, such as text boxes, subtitles, images, and interactive menus. According to an example embodiment, each metadata element may include a metadata type, an associated recording viewpoint, and additional data specific to the metadata type. In an example embodiment, a metadata element may influence the system when the video associated with the metadata recording viewpoint is currently being displayed. For example, if viewpoint #1 is being displayed, a metadata element for a UI textbox at the current time associated with viewpoint #2 would not cause a textbox to be displayed.

In an example embodiment, a metadata element may be one containing information about teleportation. This metadata element may include a destination viewpoint, and a set of coordinates in the current 360 video indicating where to display a teleportation indicator. When the viewpoint associated with this metadata is being displayed, a teleportation indicator may appear at the coordinates given. Further, when the teleportation indicator is selected by the user, the playback software may switch viewpoints to the destination viewpoint in the metadata. This metadata element may also contain additional information such as icon appearance information (e.g., an image or pointer to a memory location containing an image).

According to certain example embodiments, the playback software may read the scene file containing the video recordings, the audio recordings, and the metadata as input. The playback software may also use these data to display a 360 video and audio recording augmented with interactivity. In an example embodiment, the playback software may be initialized with a starting 360 video location to display. The playback software may also select the video bitstream and audio bitstream corresponding to this video location. In addition, the playback software may parse all metadata elements, and initialize the memory structures associated with each metadata element. The playback software may then start to read and decode 360 video and audio from the scene file for display.

In an example embodiment, the playback software may open a drawing area for display, and start a rendering loop to update what is displayed on screen. During each iteration of the loop, the playback software may check if there is a new video frame or audio sample ready from the decoder to display. If there is, the playback software may check if the appropriate time to display the video frame or audio sample has been reached. If yes, then the new video frame or audio sample may be displayed to the user. At the same time, the playback software may check the list of metadata elements in memory. If a timestamp associated with a metadata element in the list has been reached, the playback software may take action based on the metadata element. For example, a new UI element may be displayed over the 360 video, or the playback software may offset the current progress time of the video for synchronization.

According to an example embodiment, the playback software may check for inputs from the user and may update the state of the system appropriately. For example, if the display is a VR headset, the playback software may check for head movement updates from the VR headset sensors, and update the image being displayed to match their head movement. In another example, the user may select an interactive UI element being displayed using a mouse, controller, or gaze. In this case, the playback software may update the state of the system depending on the functionality of the UI element that was selected. In an example embodiment, if a teleport indicator is selected, the system may perform the necessary steps to start displaying the 360 video and audio at the new location.

In certain example embodiments, the playback software may read compressed packets of data from the scene file and send each packet to the appropriate decoder for decompression. The software may open a demultiplexer structure upon initialization to server this purpose. Further, the demultiplexer may include a file object for handling file input/output (I/O) operations and a parser to interpret chunks of memory read from the file object. The demultiplexer may also take in state information about the system and uses it to make decisions on which data packets to send to the decoder, and which to ignore. For example, the software system may keep track of which viewpoint is currently being displayed. In one example embodiment, the demultiplexer may use this information to discard packets from all bitstreams except for the bitstreams associated with the currently displayed viewpoint.

According to an example embodiment, packets from the current bitstreams may be sent to the appropriate decoders and uncompressed. Since all data may be contained in a single multimedia container, only a single demultiplexing structure may need to be allocated regardless of the number of viewpoints. Additionally, since packets from all data streams are serialized and read from the file at the same time, progress among all bitstreams may be implicitly maintained without decompressing all bitstreams. Further, in other example embodiments, timestamps of all the bitstreams may be updated simultaneously since data packets of the non-displayed bitstreams are still read. This simplifies seeking logic when switching bitstreams during viewpoint teleporting, since one may only have to search at most (GOP interval) packets away from the current file position to find the nearest intra-coded frame of the new bitstream to start decoding. Since packets from all streams may be read, the amount of resources required for reading these packets does scale with the number of stream. Additionally, in an example embodiment, in a online streaming case, this packet IO may be done on a server which would have much greater file IO bandwidth than the client computer.

Figure 7A:
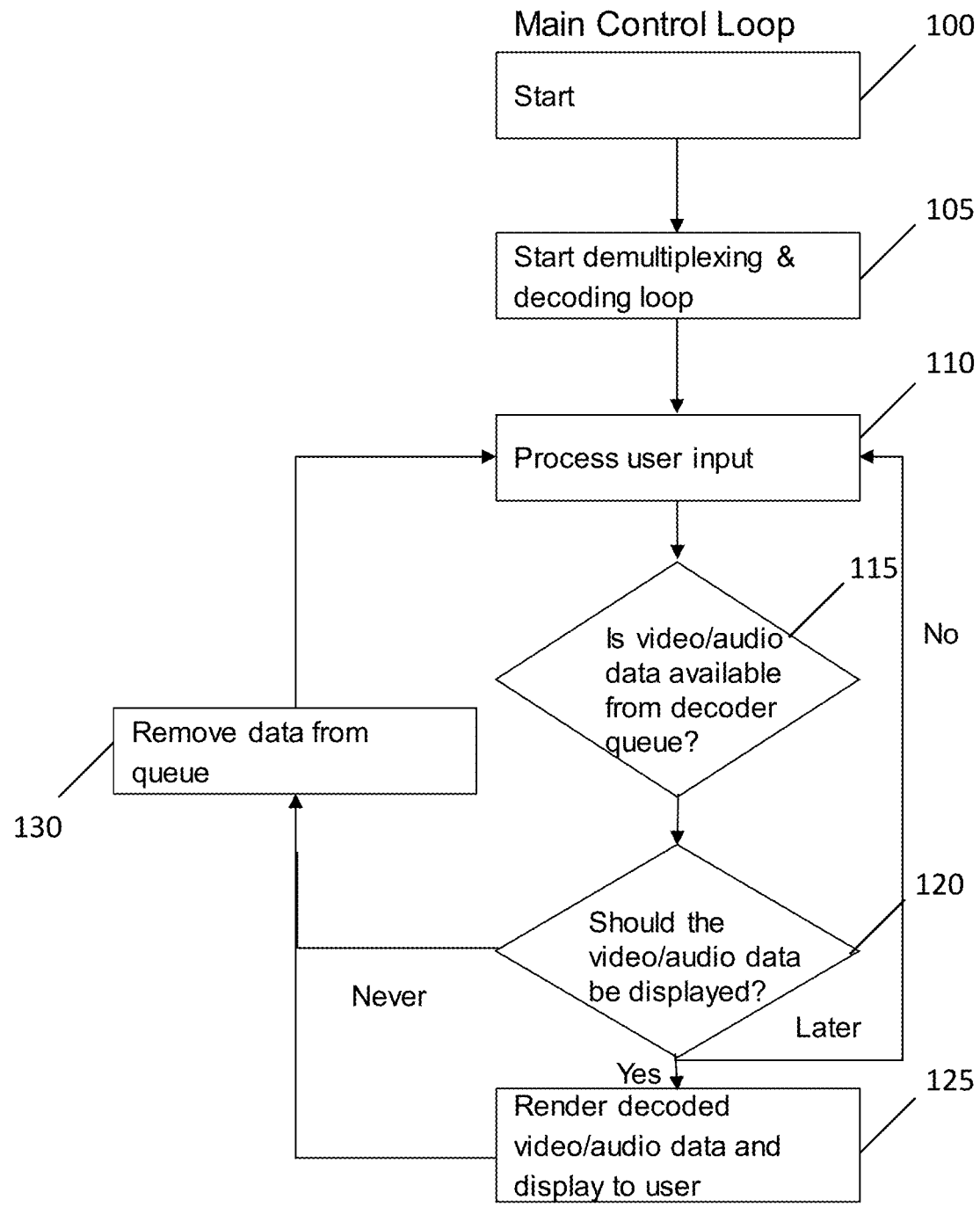
FIG. 7(A) illustrates a main control flow of a playback software, according to an example embodiment.
Figure 7B:
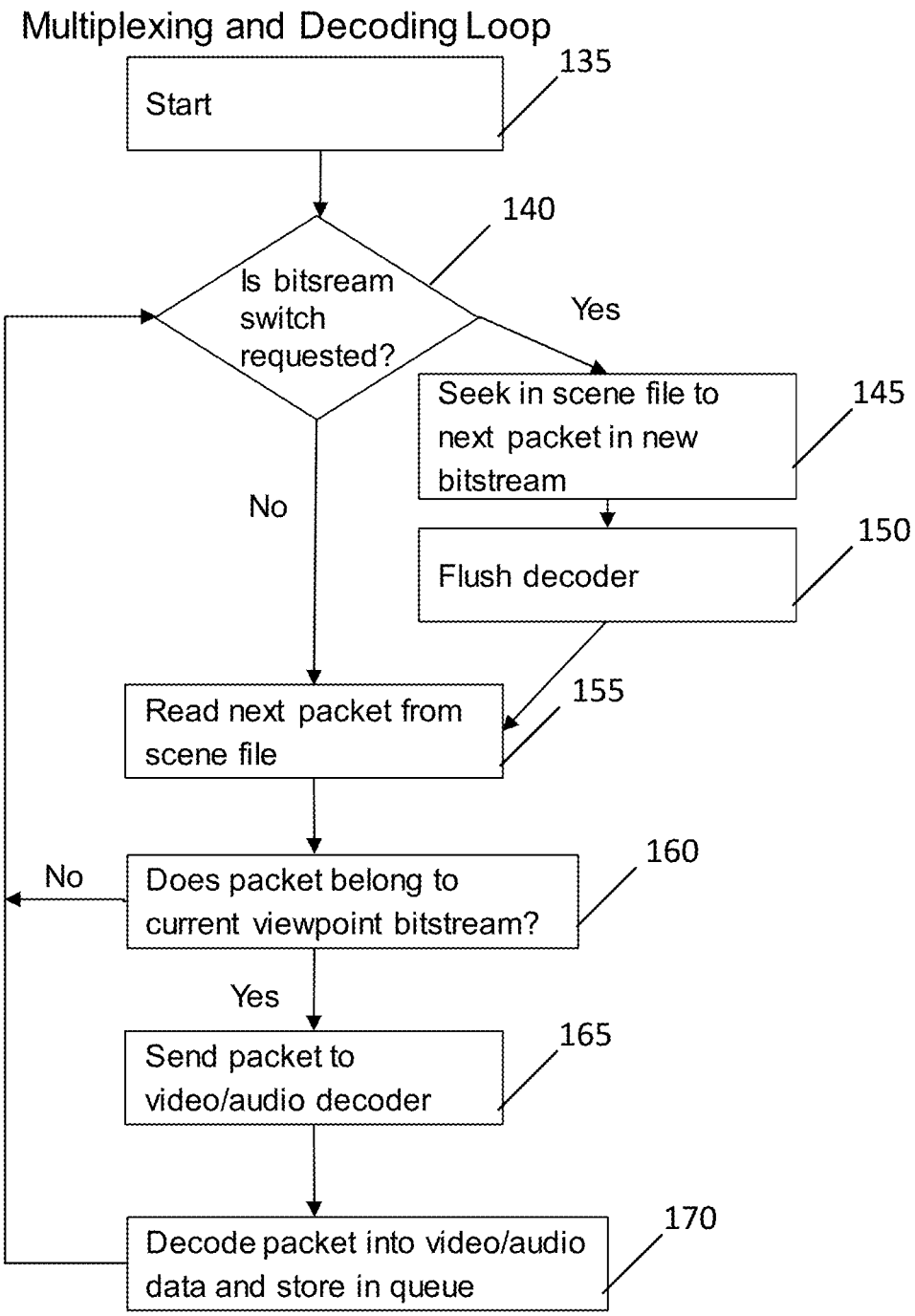
FIG. 7(B) illustrates a multiplexing and decoding loop of the playback software, according to an example embodiment.

FIG. 7(A) illustrates a main control flow of a playback software, according to an example embodiment. In addition, FIG. 7(B) illustrates a multiplexing and decoding loop of the playback software, according to an example embodiment. In an example embodiment, the control loops of FIGS. 7(A) and 7(B) may be performed by computer hardware, such as a desktop PC, mobile computer, tablet, etc. In an example embodiment, the control loops of FIGS. 7(A) and 7(B) may be performed by computer hardware, for instance, similar to apparatus 10 illustrated in FIG. 21. According to one example embodiment, the control loop of FIG. 7(A) may include, at 100, starting the main control loop. At 105, the playback software may start a demultiplexing and decoding loop. As previously noted, the demultiplexer structure takes in state information about the system and uses it to make decisions on which data packets to send to the decoder. The control loop may also include, at 110, processing user input received from the user. In an example embodiment, the user input may include user viewpoints. After the user input has been processed, the control loop may include, at 115, determining if the video/audio data is available from the decoder queue. If yes, then the control loop may include, at 120, determining if the video/audio data should be displayed. If yes, then, at 125, the decoded video/audio data may be rendered and displayed to the user, and the loop may proceed to 130 to remove data from queue, and 110 to again process user input.

As illustrated in FIG. 7(A), if at 115 it is determined that the video/audio data is not available from the decoder queue, then the loop may return to 110, where user input may be processed. In addition, if at 120, it is determined that the video/audio data should be displayed at a later time, then the control loop may return to 310. However, if at 120, it is determined that the video/audio data should never be displayed, the control loop may, at 130, remove data from the queue, and return to 110.

According to an example embodiment, the loop of FIG. 7(B) may include, at 135, starting the multiplexing and decoding loop. At 140, the loop may include determining if the bitstream switch has been requested. If yes, then, at 145, the loop may include seeking in the scene file, a next packet in the new bitstream. Then, at 150, the loop may include flushing the decoder, and at 155, the next packet may be read from the scene file. In addition, at 140, if it is determined that the bitstream switch is not requested, the loop may proceed directly 155, where the packet may be read from the scene file. Further, the loop may include, at 160, determining if the packet belongs the current viewpoint bitstream. If yes, then, at 165, the loop may include sending the packet to the video/audio decoder. If no, then, the loop may return to 140 to determine if the bitstream switch was requested. After the packet is sent to the video/audio decoder, the loop may include, at 170, decoding the packet into video/audio data and storing the video/audio data in queue. After the packet has been decoded into video/audio data and stored in queue, the loop may return to 140 to determine if the bitstream switch has been requested.

In certain example embodiments, compressed video data packets from the demultiplexer may be decoded into a picture that can be displayed to the user. For this, the playback software may initialize a decoding component and use it to decompress data packets before rendering. In an example embodiment, each separate decoder may have its own memory context and buffers that it uses during the decoding process. According to an example embodiment, a single decoder may be used to decode a single compressed video. Further, the consistency constraint may be enforced to allow the software to use a single decoder to decode any number of video bitstreams in a scene file. This decouples the decoder memory requirements from the amount of viewpoints in the scene allowing for the ability to scale to many more viewpoints than if a traditional multimedia container/decoder scheme was used. Furthermore, in an example embodiment, since only one video is being decoded at a single time (packets from non-displayed video recordings are discarded), the computational resources used by the playback software when decoding may be constrained for any number of viewpoints.

According to certain example embodiments, once the currently selected viewpoint packets are sent to the decoder, the decoder may uncompress the packet into a video frame, which can be displayed to the user. The packet may also come with a timestamp indicating the appropriate time to display the uncompressed data so that the progress time of the scene in the recording matches the progression of time during recording. In an example embodiment, to allow a single decoder scheme to work for multiple bitstreams, the following steps may be taken when a bitstream switch is requested, for example in the case of a user teleporting to a different viewport.

First, the decoder may be flushed of all data and state information associated uniquely with decoding the current bitstream. This may include previously decoded frames used to reconstruct predicted frame types, frame number, and timebase. However, in an example embodiment, the decoder may not be flushed with information universal to all bitstreams with the same type (audio vs video), which can be used to decode the next bitstreams. This information may include coding format type, frame resolution, pixel format, and more. By not reinitializing this information, decoder state update costs during stream switching may be minimized and become negligible. However, if the scene file is switched during playback, for example in the Internet streaming case previously described, then the decoder may be reinitialized to support the characteristics of the bitstreams in the new scene file. This may cause a brief period of greater latency while initialization is occurring. However, according to certain example embodiments, this latency may be hidden through different techniques, such as buffering future frames before re-initialization.

In certain example embodiments, if synchronization information is included in the metadata, the metadata may be read to find a timestamp offset to apply when timing the new bitstream. In another example embodiment, the current progress timestamp may be adjusted using this offset so that time progresses smoothly when switching. Next, the demultiplexer may seek in the file to find the nearest packet containing intra-coded frame data for the new bitstream. Nearest may refer to the packet having a timestamp that is closest to the current progress timestamp. This may be the first packet fed into the decoder to start producing pictures from the new bitstream. In addition, this packet may contain data from before or after the current progress timestamp. According to an example embodiment, to keep progress consistent across viewpoints, uncompressed pictures that do not match the current progress time to be discarded may be marked. These uncompressed pictures may not be displayed to the user, but may be used for reference when decoding future packets. In an example embodiment, when a picture with the appropriate display timestamp to keep progress consistent is reached, the picture may then be displayed to the user.

Figure 8:
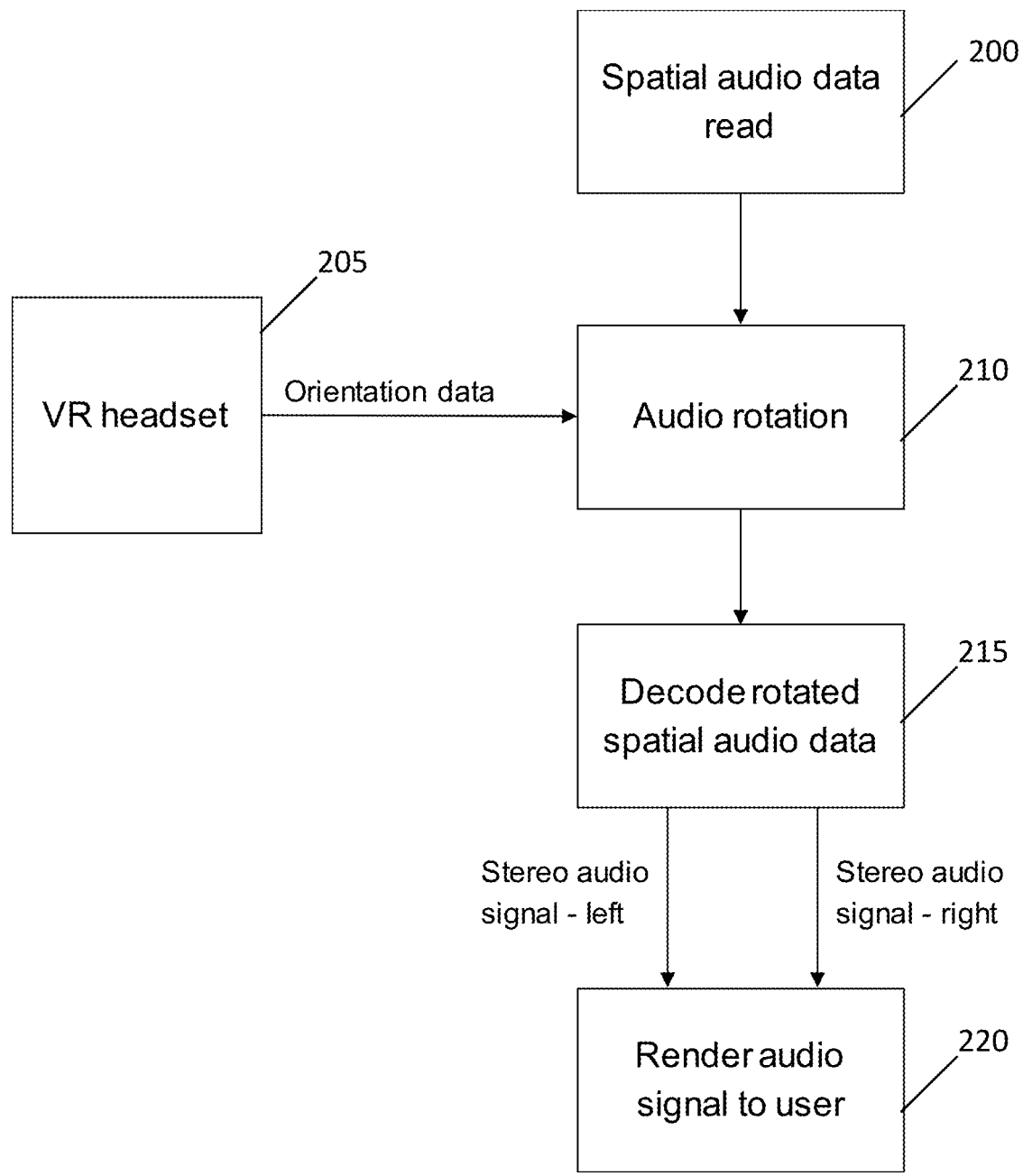
FIG. 8 illustrates a spatial audio decoding procedure, according to an example embodiment.

FIG. 8 illustrates a spatial audio decoding procedure, according to an example embodiment. For example, FIG. 8 illustrates a spatial audio decoding from 4 channel B-format and audio rotation input into stereo audio output to headphones. In an example embodiment, the procedure of FIG. 8 may be performed by computer hardware and a VR headset, such as a desktop PC with Oculus Rift, a mobile VR headset, or a smartphone. According to one example embodiment, the procedure of FIG. 8 may include, at 210, performing audio rotation with spatial audio read data from 200 and orientation data from a VR headset 205. In an example embodiment, at 200, the audio data may be read from a storage device such as a hard drive, and loaded into memory (e.g., RAM). In another example embodiment, a CPU may orchestrate the reading of the data. According to a further example embodiment, at 205, the VR headset may be responsible for head rotation input values used at 210 to determine the desired audio rotation. In addition, the VR headset may include inertial measurement unit (IMU) sensors that may detect the orientation of the headset. In another example embodiment, at 210, a CPU may calculate the correct manipulation of the audio data values to "rotate" the audio. In a further example embodiment, the GPU may perform the same calculations. The procedure may also include, at 215, receiving audio rotation input from 210, and performing spatial audio decoding from 4 channel B-format and audio rotation input into stereo audio output to headphones (e.g., the user). In an example embodiment, the CPU or GPU may perform the decoding of the audio data at 215. The procedure may further include, at 220, rendering the stereo audio signal (left and right) to the headphones worn by the user.

According to certain example embodiments, the ambisonic B-format audio file may be decoded using an ambisonic decoder. The viewing direction of the user may be passed in as an input to the ambisonic decoder. In addition, the decoder may combine the 4-channel sound field to simulate the audio in the specified viewing direction. The result of the decoded ambisonic audio is a 2-channel left/right stereo audio format, which can be played back in headphones for the optimal hearing experience.

In an example embodiment, for viewport switching events, the audio decoder may follow a similar process to the video decoder. For example, the decoder may flush all current undecoded packets, and ingest new packets from the new audio stream. Since the audio packets does not rely on previous samples to decode the current packet, the synchronization process may be much simpler. Moreover, if the display timestamp is different from the decoded timestamp, previous packets may be sought, or the packets may be skipped to synchronize the audio.

According to an example embodiment, the 360 video frames may be represented as rectangular pictures containing a projection of the 360 sphere. In addition, the projection may be remapped back to a panoramic image during rendering, and then displayed as a viewport containing a smaller region of interest of the entire 360 sphere based on where the user is currently looking (FIG. 2(B)). In another example embodiment, the UI elements may be rendered in this viewport if they are visible in the region of interest. For example, if the coordinates contained in the metadata for a teleportation point at the current time are within this region of interest, the system may render the associated teleportation UI in the viewport to inform the user that teleportation is possible. If the user's selected region of interest changes so that the coordinates for a UI element are no longer in the region of interest (for example, if the user in a VR headset turns around 180 degrees), the system may stop rendering the UI element in the viewport. In certain example embodiments, since the UI element may be stationary relative to the 360 video, this may give the illusion that the UI element is part of the scene. On the other hand, if the metadata for the UI element specifies that the element is fixed to the viewport, then the UI element may display at the same position regardless of the region of interest selected in the currently displayed 360 video.

According to certain example embodiments, a user may desire that the recording of the scene data is progressively streamed to their device instead of downloading the whole file before playback. Thus, certain example embodiments may be adaptable to a streaming configuration. An example configuration of the software may include two separate software components: a server side software and a client side software system. The server side software may run on a remote Internet server, along with the scene file to be streamed to the client. Further, the server software may contain the demultiplexer, reading the scene file and parsing compressed data packets as described herein. The server software may also include an extra networking layer that takes compressed data packets corresponding to the current viewpoint, and transmits them to the client over the Internet. In addition, according to certain example embodiments, packets from non-current viewpoints may be discarded. Furthermore, the client software may include the decoders the renderer, and an extra networking layer. The networking layer may receive compressed data packets from the server software and send them to the decoder to be decompressed as described herein. The decompressed data may then rendered using the same methods described herein.

In certain example embodiments, both the server and client software may share state information about the system to coordinate the two components. For example, the client software may transmit signals when the current viewpoint changes so that a different bitstream is sent, and when the scene playback should start and stop. Furthermore, the server software may send a signal indicating the state of the scene file. For example, whether the demultiplexer is currently seeking, current progress time, and if the end of the file has been reached. Certain example embodiments may only require bitstream data associated with the currently displayed viewpoint to be transmitted from the server to the client. This means that the network bandwidth required to view a scene with any number of viewpoints may be equivalent to the bandwidth required for a single 360 video.

Certain example embodiments may provide a system that uses image/video data captured by a camera array to reconstruct view dependent holograms in real-time. The system may use color and depth information as a 3D representation instead of a conventional polygon mesh. The system may also utilize multi-stream video compression formats to encode multi-view camera data. In addition, the system may use a subset of the camera views to reconstruct holograms from any given point and thus delivers high quality holograms at a much lower data bandwidth.

According to certain example embodiments, a graphics processing unit (GPU) may be implemented in an accelerated foreground extraction and depth map generation software. For example, in one embodiment, frames captured from a camera array may be preprocessed into a compressed format for real-time reconstruction and playback. In certain example embodiments, the preprocessing steps may include calibrating the camera parameters, extracting foreground subject from background frame, using visual hull to generate polygon mesh, and rendering depth maps of the mesh from real camera perspectives.

Figure 9:
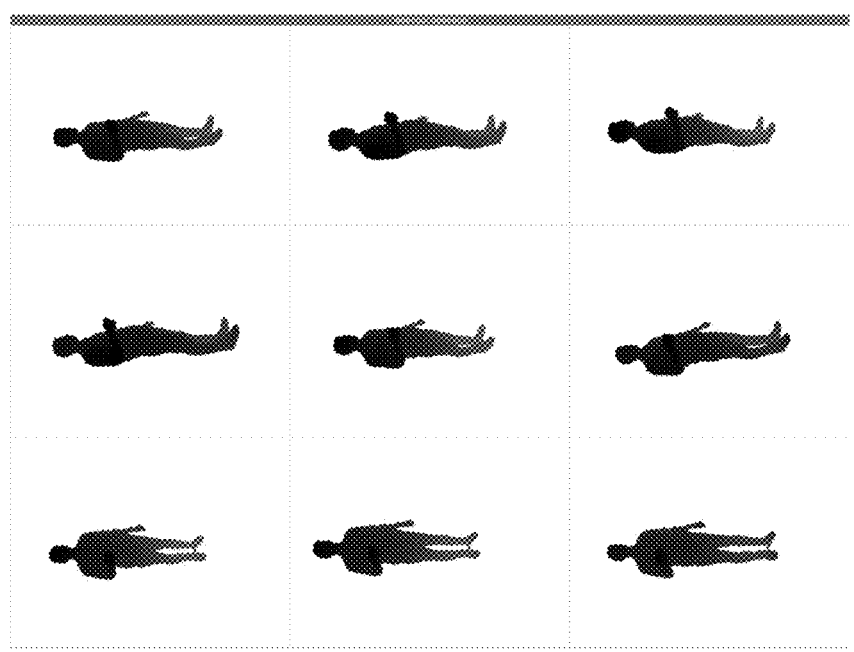
FIG. 9 illustrates a depth map, according to an example embodiment.

FIG. 9 illustrates a depth map, according to an example embodiment. In particular, FIG. 9 illustrates a depth map from nine nearby real camera views. In certain example embodiments, depth maps may be rendered from a preprocessing stage, and may be used to interpolate views from real camera views to virtual camera views. In another example embodiment, nearby camera views may be required for real-time reconstruction.

Figure 10:
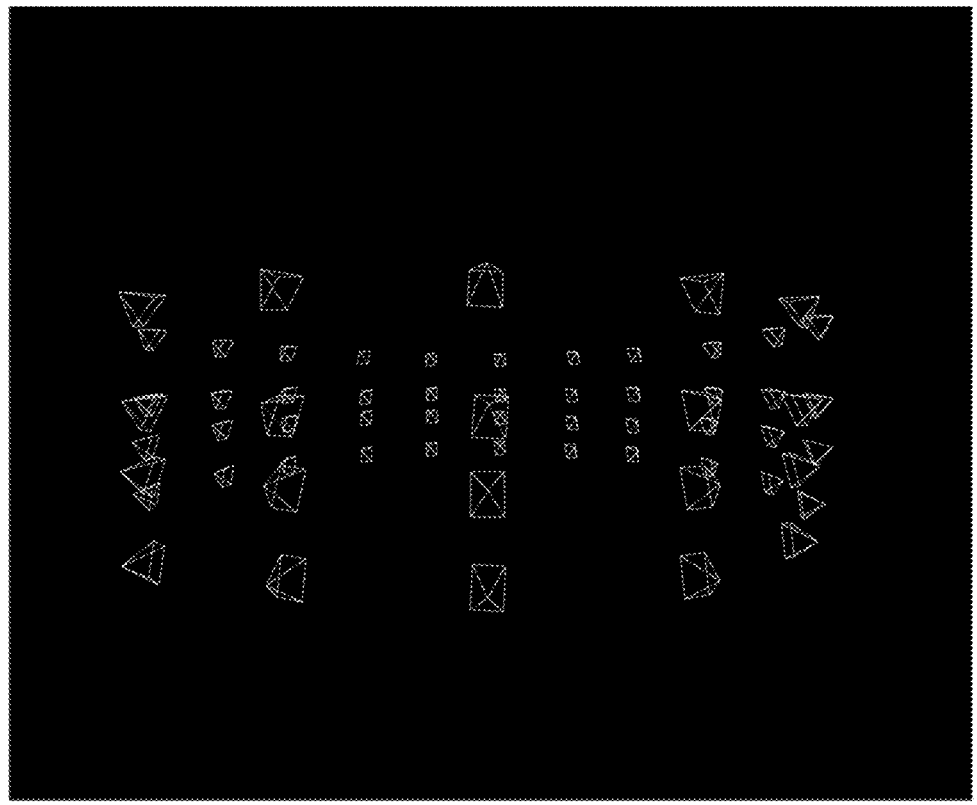
FIG. 10 illustrates a calibrated camera array, according to an example embodiment.

FIG. 10 illustrates a calibrated camera array, according to an example embodiment. In particular, FIG. 10 illustrates real camera parameters that are calibrated using feature detection, feature matching, and bundle adjustment. In addition, nearby cameras may be determined using the camera extrinsics. As illustrated in FIG. 10, the camera may be calibrated. For instance, a calibration step may be performed to estimate the intrinsic properties of each camera unit as well as the relative extrinsic position of each camera unit in the studio. According to an example embodiment, a standard checkerboard calibration pattern may be used to calculate the intrinsics of each camera unit. To estimate camera extrinsics, a set of frames containing an abundance of visual feature points may be taken. In certain example embodiments, the features may refer to distinct feature points in an image (frames). For example, they may be represented by feature descriptors that capture the relationship between a pixel and its neighbors. In addition, distinct feature points from two different images (e.g., corners of a table) may be used to estimate camera position and orientation in a calibrated scene.

In an example embodiment, the feature correspondences may be established between frames of nearby camera units to triangulate a sparse point cloud. In addition, the estimated point cloud position and camera extrinsic parameters may be adjusted to minimize re-projection error using bundle adjustment. In the case of a video, the calibration operation may be performed once on a single reference frame of the video, rather than re-calibrating for each frame in the video. Further, the estimated camera parameters may be used for real-time reconstruction and rendering.

According to another example embodiment, the background may be subtracted. For example, background segmentation may be performed to isolate the subject in each frame from the background pixels. A background frame may be captured prior to recording when no subject is in the capture volume. In addition, the background segmentation algorithm may use two frames for each camera, the background capture frame, and the subject capture frame. According to an example embodiment, the algorithm may find differences in contents between the two frames and create a new image containing only contents that are unique to the subject capture frame (i.e., the subject). Furthermore, in an example embodiment, the algorithm may optimize the foreground mask using morphological operations to further refine the results of background segmentation. To compensate for different studio lighting conditions and subject clothing differences, certain example embodiments may provide a parameter tuning software to adjust the various parameters for the background subtraction software.

In certain example embodiments, visual hull and marching cubes may be used to create mesh. For instance, one embodiment may use the camera parameters generated in the calibration step and the new foreground image created in the background segmentation step to calculate a three dimensional volume of the subject. By using the camera parameters of each camera, the non-empty regions of the foreground image of each camera may be projected into a three dimensional volumetric grid. In certain example embodiments, any grid point that falls within the projection area of a camera may be considered interior of the projected volume of that camera. By taking the intersection of the interiors of the projection from each camera, a volumetric grid who's non-zero values approximate the three-dimensional structure of the captured subject may be left over. According to a further example embodiment, a threshold may be set on these non-zero grid values to further refine the boundary of the captured volume.

According to an example embodiment, the volume may be compressed into a polygon mesh that represents the surface of the volume. In an example embodiment, the surface may be defined on the volumetric grid as the set of interior grid points which neighbor non-interior grid points. This set of points may be triangulated into a set of polygons whose connectivity forms a polygon mesh. In one example embodiment, this algorithm may be known as the "marching cubes" algorithm.

In certain example embodiments, a depth map may be rendered from mesh using calibrated camera parameters. For instance, the polygon mesh may be rendered from each of the real camera view to generate coherent and accurate depth maps. Using the calibrated camera parameters and polygon mesh of the subject, depth maps of the mesh may be rendered from the perspectives of the calibrated cameras. In addition, according to one example embodiment, each depth map may provide view dependent information about the distance to the surfaces of captured subject from the camera. Due to occlusion, a single depth map may not capture the entire geometry of the captured volume. However, at the rendering stage, a system of one example embodiment may fuse multiple nearby camera views into a comprehensive 3D geometry. Thus, each depth map may represent a subsection of the captured volume, and when combined, may reconstruct the 3D subject in whole. In another example embodiment, the polygon mesh may be discarded after this step as the depth maps may have all the information necessary to reconstruct the 3D geometry.

Figure 11:
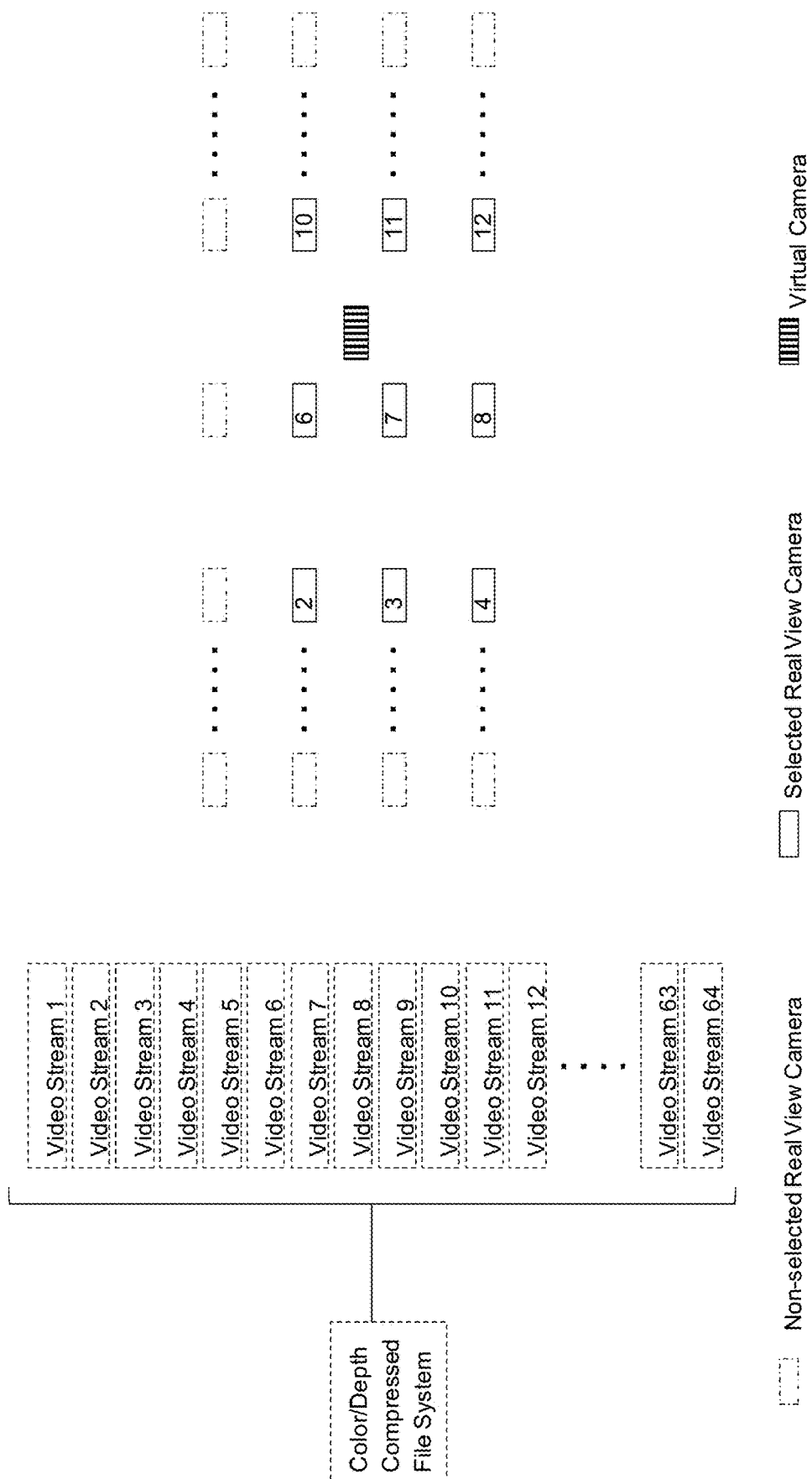
FIG. 11 illustrates a multi-view video format, according to an example embodiment.

FIG. 11 illustrates a multi-view video format, according to an example embodiment. For instance, FIG. 11 illustrates color and depth frames that may be encoded into multiple streams in a single video file. As illustrated in FIG. 11, each color and depth frame captures data from one real camera view. In one example embodiment, only the selected camera view may be decoded at the time of rendering to interpolate into the virtual camera's view. According to an example embodiment, a method may be provided for utilizing multiple video stream to encode multi-view video format for viewing dependent rendering. For example, the preprocessing steps may generate a color frame and a depth frame from each of the capturing real cameras. According to an example embodiment, video encoding techniques may be utilized to encode and compress individual frames into a coherent multi-view video format for transmission and rendering. In one example embodiment, the video encoding techniques may include Multiview Video Coding. In another example embodiment, a set number of camera views may need to be decoded at the time of rendering. Thus, the multi-view video format in certain example embodiments may be optimized for low bandwidth transmission and rendering while maintaining the highest level of detail.

In another example embodiment, foreground frames and depth map frames may be encoded into videos from each camera perspective. For example, the extracted foreground frames and depth map from each view may need to be encoded into videos for compression. As such, in one example embodiment, established video compression formats may be utilized to convert a series of image frames into a compressed video bitstream. In addition, for each camera view, the RGB foreground frames may be encoded into a single video, and the grayscale depth map images may be encoded into a separate video.

According to a further example embodiment, multi-view videos may be mapped into streams of a video to achieve multi-view encoding. For example, multimedia container formats such as MP4 may have support for multiple bitstreams for distribution of media contents. According to an example embodiment, this feature may be used for having a single video track, multi-language audio tracks, multi-language subtitle tracks, and any side band data. In one example embodiment, feature may be adapted to reduce the complexity and overhead of decoding multiple streams of video. In addition, an RGB video stream and a grayscale depth video stream may be included for each camera view. Furthermore, in certain example embodiments, video streams of all cameras may be multiplexed into one single multimedia container.

In certain example embodiments, the streams needed to reconstruct geometry may be decoded to provide scalable streaming capabilities with a low bandwidth requirement. For example, at the time of decoding, it may only be necessary to decode the streams that are needed to fuse the current virtual view. Thus, only a subset of streams may need to be actively decoded, and only the relevant data may need to be transmitted through network and uploaded to GPU. As such, it may be possible to make the decoding scheme scalable to any number of camera set up with flexible number of texture/depth video streams.

Figure 12:
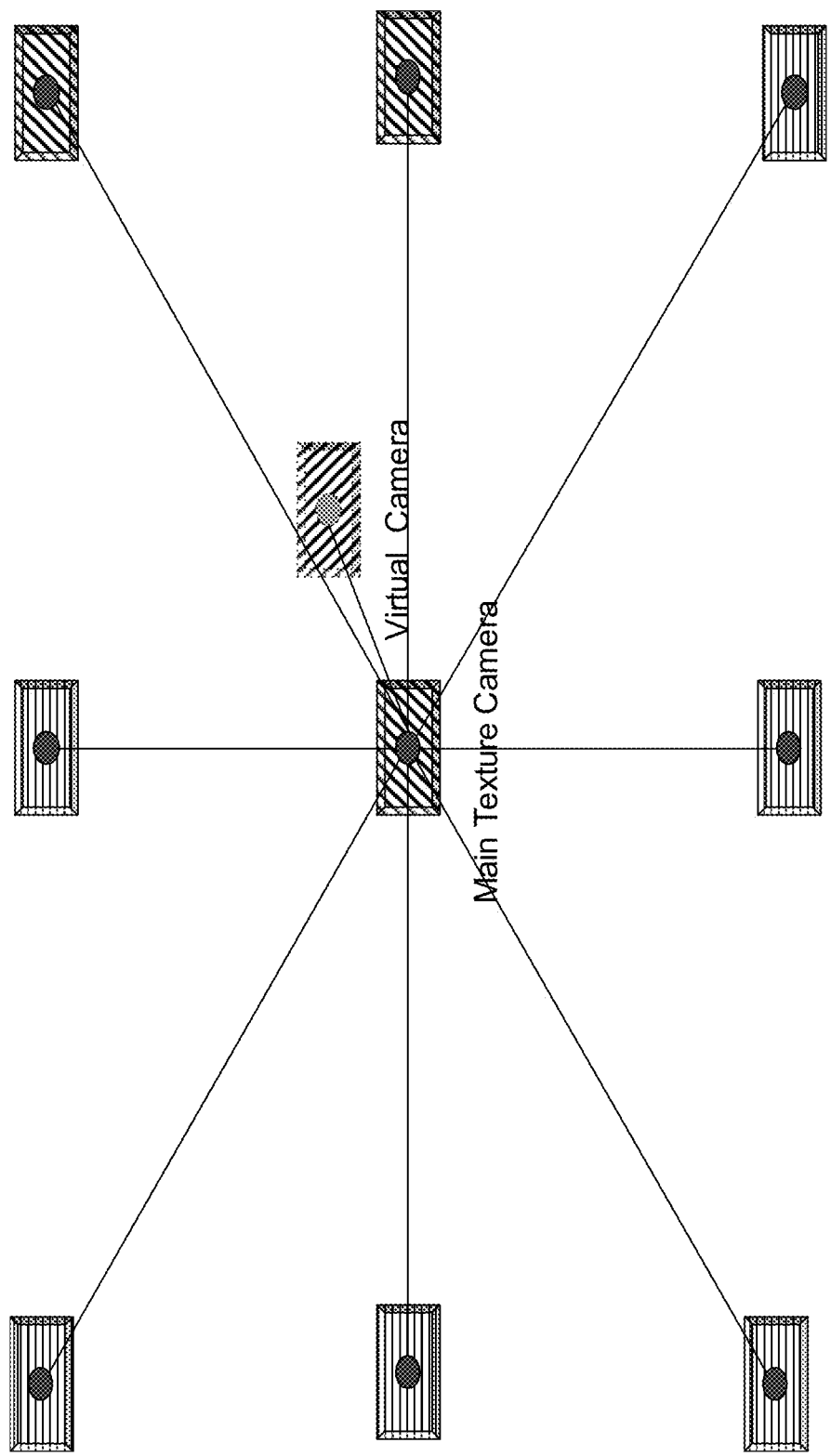
FIG. 12 illustrates a nearby camera selection, according to an example embodiment.

FIG. 12 illustrates a nearby camera selection, according to an example embodiment. For instance, in one embodiment, a nearby real camera may be selected based on the virtual camera's position (view of which the captured volume is being rendered from). Further, the selected nearby real camera may interpolate the virtual camera's view. In another example embodiment, nine views may be desired to produce a good coverage of occluded areas. However, in other example embodiments, 3 views (center camera, and rightmost top and middle cameras) forming an enclosing triangle that is sufficient enough to create a visually correct 3D reconstruction.

Certain example embodiments may provide a method for interpolating views from a number of nearby captured views using RGBD data. For example, an example embodiment may provide a way of interpolating nearby camera views using only RGBD (RGB+Depth) data. This method reconstructs the captured volume in real time using only camera parameters and depth information. Furthermore, this enables playback software to render highest level of detail 3D asset (same resolution as captured camera frames) using only a few camera views. In addition, the multi-view video format of one example embodiment may be designed to support this kind of specialized rendering technique.

In an example embodiment, virtual camera may be set up at the time of rendering to render the captured volume. The virtual camera's position may be updated according to user control, which may enable free movement around the captured volume to view the 3D asset from any direction. In another example embodiment, a subset of camera views close to the virtual camera may be selected to reconstruct the captured 3D asset in real-time. In addition, using the center of the captured volume as the origin, it may be possible to start by projecting all camera positions (real calibrated cameras and virtual camera) onto a unit sphere along the vector connecting the origin and camera positions.

Next, the camera that has the smallest orthodromic distance (great-circle distance) may be selected as the main texture camera. In an example embodiment, the main texture camera may have the view that is most aligned with the view of the virtual camera. Thus, it most closely captures the information to reconstruct the physical appearance and lighting of the subject from the virtual camera's perspective accurately. Additionally, in certain example embodiments, adjacent camera views may also be used to supplement the reconstruction and texturing of the captured volume. For instance, in one camera setup, real camera views may be fused to compose the novel view from the virtual camera.

However, in certain example embodiments, three views may be sufficient enough to create a visually correct 3D representation.

Figure 13:
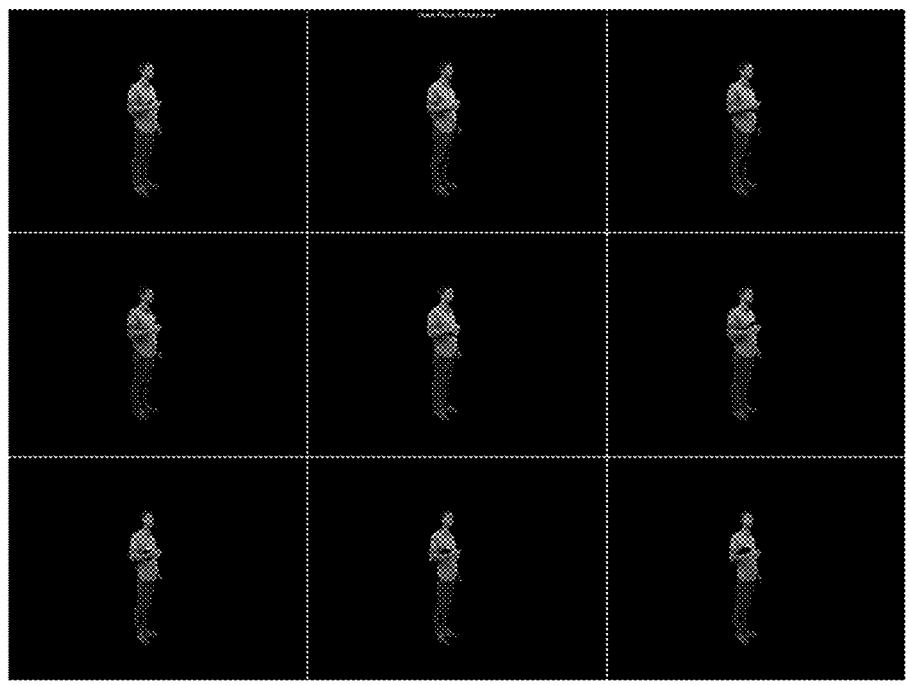
FIG. 13 illustrates re-projected views from a nearby camera, according to an example embodiment.

FIG. 13 illustrates re-projected views from a nearby camera, according to an example embodiment. In particular, FIG. 13 illustrates re-projected points of a nearby camera from the perspective of a virtual camera. In an example embodiment, interpolated views may be acquired by re-projecting a vertex grid using depth maps and parameters of real cameras. These may be re-projected points that are visible from real cameras rendered from the perspective of the virtual camera. Certain example embodiments may also provide depth based re-projection of a vertex grid and texturing from corresponding captured views. For example, calibrated camera parameters and the depth map may be used from the calibrated camera's view, which can make it possible to extrude 2D points in the image plane into points in 3D space, and then re-project them into the virtual camera's view. This may be accomplished by setting up a planar grid of connected vertices. Each vertex may be mapped to a texture coordinate ranging from $(0,0) \to (1,1)$. For every $(u, v)$ texture coordinate from $(0,0) \to (1,1)$, depth and color values may be extracted from the depth map and the texture image respectively.

In an example embodiment, the depth value at coordinate $(u, v)$ may be denoted as $D(u, v)$, and the color value at coordinate $(u, v)$ may be denoted as $T(u, v)$. $D(u, v)$ may be a single channel scalar value, and $T(u, v)$ may be a triple channel vector. In addition, the 4×4 matrix containing intrinsic parameters of the real camera x (x ranges from [1, # of Cameras]) as $K_x$ and of the virtual camera v as $K_v$. Further, the 4×4 matrix containing extrinsic parameters of the real cameras may be denoted as $P_x$, and of the virtual camera v as $P_v$. Further, the extruded 2D point from camera x at $(u, v)$ may be denoted as $p_{extrudedPoint}$. As such, the world coordinate space may be calculated as $$p_{extrudedPoint} = P_x^{-1} K_x^{-1} [u, v, D(u,v), 1.0]^T \quad (1)$$

Then, re-projecting this point into the virtual camera's perspective may result in:

$$p_{reprojectedPoint} = K_v P_v P_x^{-1} K_x^{-1} [u, v, D(u,v), 1.0]^T \quad (2)$$

The color of each re-projected point $p_{reprojectedPoint}$ may be sampled from $T(u, v)$. Using the method described above, a partial 3D geometry of the captured volume may be reconstructed using the information captured from the perspective of the real camera view. Then, certain example embodiments may render the geometry from the perspective of the virtual camera, and texture map the colors from the real camera view. Since the extruded 2D points originated from the vertex grid, they maintain the connectivity of the vertex grid. Thus, the regions in-between the vertices may be interpolated by the fragment shader. In an example embodiment, the fragment shader may be a shader stage in the computer graphics rendering pipeline. For instance, this stage may use inputs from rasterized primitives (e.g., triangles) that are called Fragments. The fragment shader may process the inputs and color them. Further, the resulting output may be a set of colors and a single depth value for the next steps of the computer graphics pipeline.

Other example embodiments may provide layered rendering of the vertex grid from the perspective of the view using the geometry shader. For example, the operation described above may generate re-projected partial geometry of the captured volume for each real camera. Regions that are not rendered due to occlusion may be filled in from other nearby real camera views. As described above, multiple nearby real camera views may be fused to create a single virtual camera view. Thus, certain example embodiments make it possible to iterate through the operation described above for depth based re-projection for each of the real cameras to generate interpolated views from the perspective of the virtual camera. In another example embodiment, this may be facilitated by using a layered rendering process of the geometry shader to emit primitives into different layers of a multi-layer framebuffer.

According to an example embodiment, a layered framebuffer may be setup with nine render layers, with both color and depth components. In addition, a planar grid of vertices ranging from $(-1,-1,0) \to (1,1,0)$ may also be setup. These vertices may be mapped to texture coordinate from $(0,0) \to (1,1)$ and re-projected based on the depth $D(u, v)$ from each real view camera. Further, according to certain example embodiments, camera parameters of the real camera views as well as the virtual camera may be uploaded to the shader program and updated before each draw call. In addition, each camera may have re-projected points rendered into its own layer of the framebuffer. As the re-projected points represents actual 3D geometry, their corresponding depth may be rendered into the depth buffer. In another example embodiment, multi-layer color and depth components rendered from surrounding real cameras may be fused into a single novel virtual camera view of the captured volume in a second pass rendering.

Figure 14:
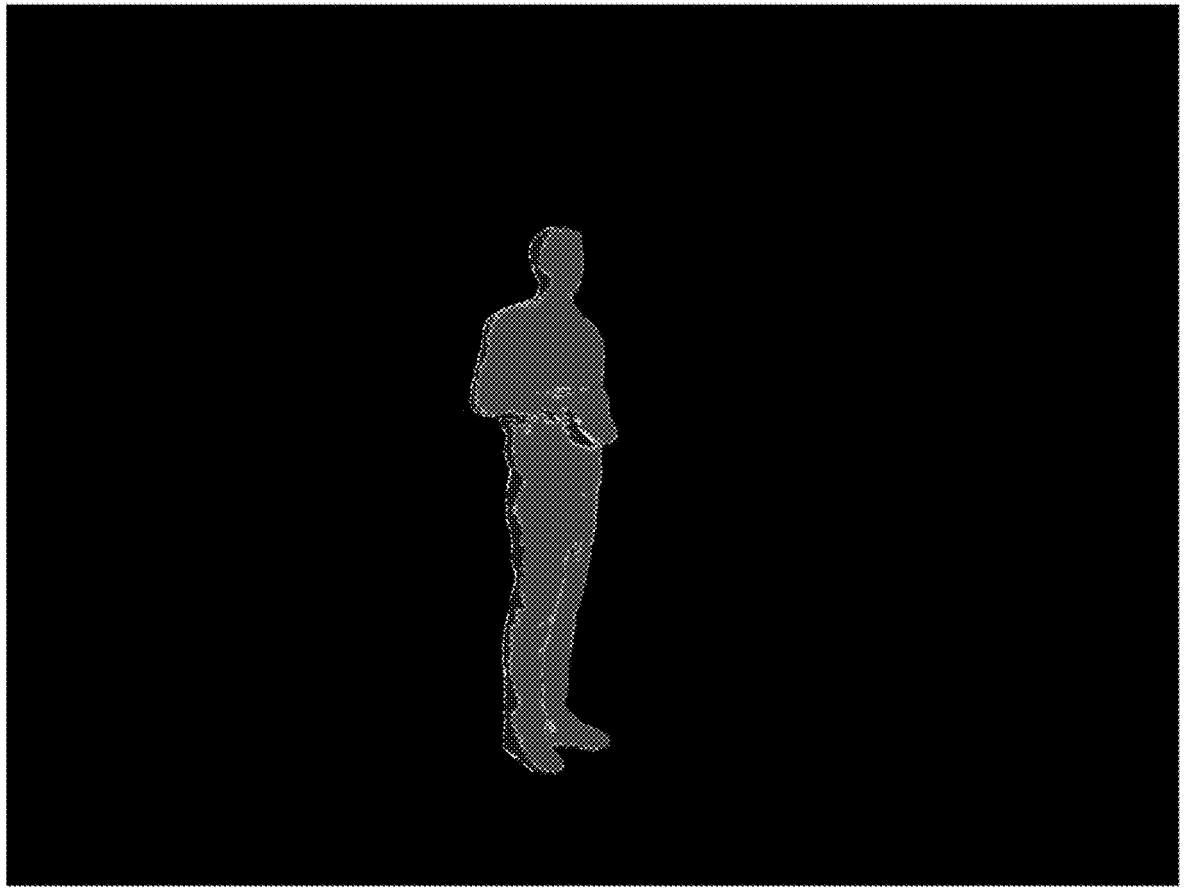
FIG. 14 illustrates a blending of multiple camera views, according to an example embodiment.

FIG. 14 illustrates a blending of multiple camera views, according to an example embodiment. For example, as illustrated in FIG. 14, camera view textures of the three nearest cameras may be blended using barycentric weights. The light-gray shaded region in the majority of the image illustrate blending of all three camera textures, the white center shaded regions of the image represents blending of two camera textures, and the dark-gray shaded region that outlines the image represents one camera texture. Further, the white border regions in FIG. 11 represent uniform weight blending of the remaining valid camera views.

In an example embodiment, multi-layer re-projection rendering may be fused using manual depth testing (with threshold depth region), and blending using barycentric weights and uniform weights. For example, one embodiment may run a second pass rendering to fuse the layers of images stored in the framebuffer. Further, another example embodiment may draw a simple quad with the same dimension as the previous rendering pass, and use the fragment shader to sample into the multi-layer framebuffer. For each fragment, the multi-layer color and depth framebuffer may be sampled. In another example embodiment, the depth samples may be compared, and any framebuffer texture that has either no depth (indicating nothing rendered at this location on this layer) or farther than the minimal depth by a small margin may be discarded.

According to an example embodiment, sample textures that have the least depth or are within a small margin of the least depth may be considered as valid. This may be equivalent to conducting a depth test with a small margin that allows multiple framebuffers to be blended into the final output. In an example embodiment, the framebuffer color components may be fused by blending the valid sample textures. In doing so, the three nearby cameras that form a triangle that encloses the virtual camera may first be blended. The barycentric weights of these cameras in respect to the virtual camera may be calculated. Using these weights, the valid sampled textures may be blended from these camera views to form the final fragment color. Although the three nearby cameras may cover a majority of the captured volume, there may still be regions that are occluded and not visible to all three cameras. According to a further example embodiment, the remaining six cameras may be utilized to fill in any occluded regions of the rendered view. In addition, valid sampled textures from these cameras may be blended uniformly to form the final fragment color for the remaining visible regions. The final result may be a fused frame from re-projected points and textures of up to nine nearby real camera views which approximates the appearance of the volume as seen from the view of the virtual camera.

A system according to one example embodiment may accommodate for different levels of detail due to the nature of our input data. For instance, the renderer may use texture and depth videos as input, which can be down-sampled using standard video processing software to reduce level of detail. Compared to mesh-based implementations which may need to simplify a structured mesh, a depth based method in one example embodiment may only need to down-sample 2D image frames. Further, view dependent texture videos of certain example embodiments may also be more visually accurate when projected onto a simplified 3D geometry. In addition, the quality of the geometry of the 3D asset in certain example embodiments may be determined by the resolution of the depth maps; the quality of the visual details of the 3D asset may be represented by the resolution of the texture maps of certain example embodiments. Depending on the distance of where the asset is being rendered, certain example embodiments provide the possibility of dynamically choosing the highest resolution texture and depth videos to deliver the best quality that bandwidth allows. This technique lends itself to adaptive bitrate streaming for various network streaming bandwidths and various device display characteristics.

Figure 15:
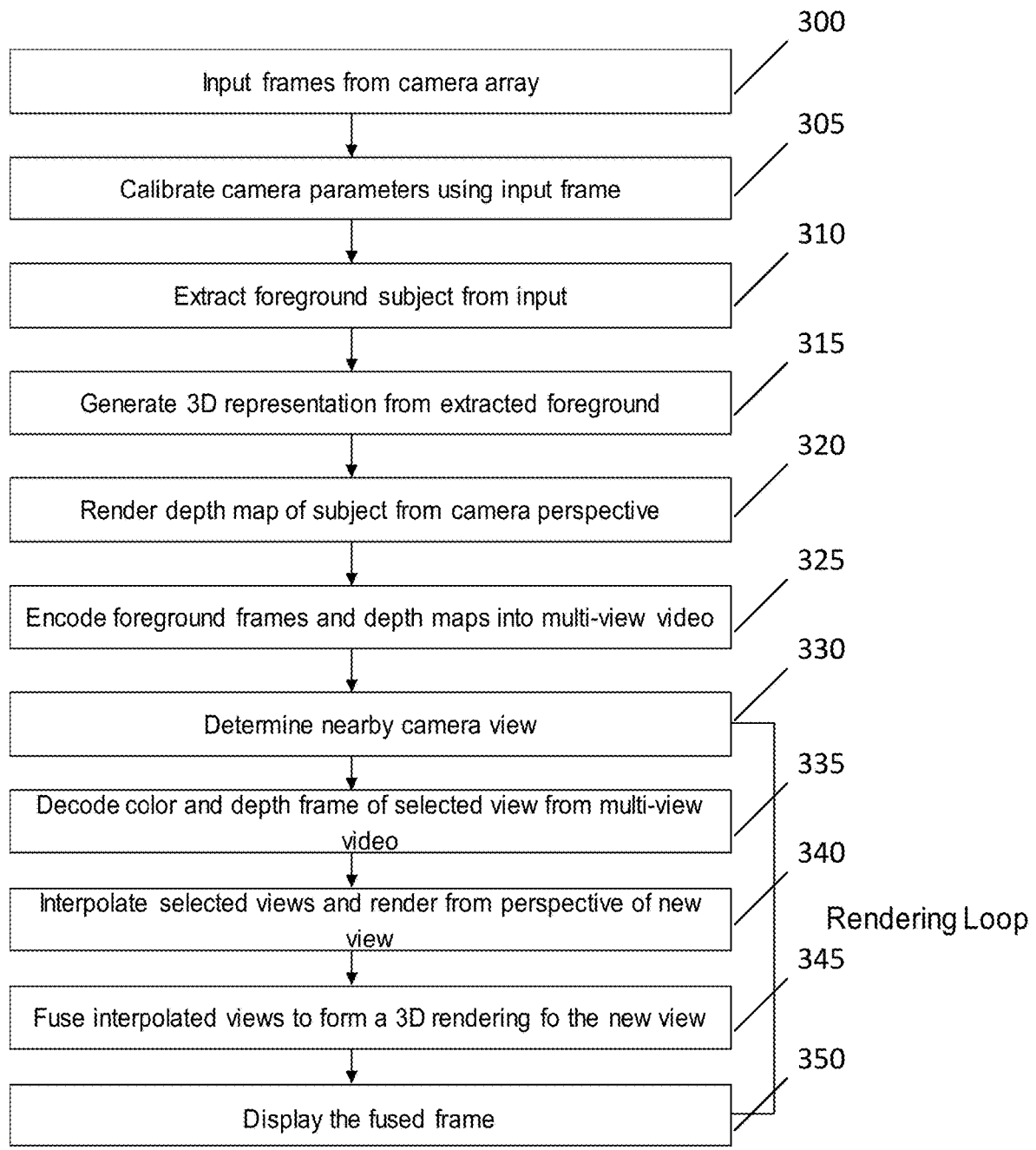
FIG. 15 illustrates a processing and rendering pipeline flow chart, according to an example embodiment.

FIG. 15 illustrates a processing and rendering pipeline flow chart, according to an example embodiment. In an example embodiment, the preprocessing and rendering procedure of FIG. 15 may be performed by a computer, such as a workstation PC. In an example embodiment, the procedure of FIG. 15 may be performed by a computer or workstation PC, for instance, similar to apparatus 10 illustrated in FIG. 21. According to one example embodiment, the procedure of FIG. 15 may include, at 300, inputting frames from a camera array. In an example embodiment, the inputting frames may include the image/video frames captured by the camera sensors. In another example embodiment, the light information received by the camera may be processed by the camera into standard data formats such as MP4 for video and PNG for images. Additionally, the procedure may include, at 305, calibrating the camera parameters using the input frames. The procedure may further include, at 310, extracting a foreground subject from the input frame, and at 315, generating a 3D representation from the extracted foreground. Further, the procedure may include, at 320, rendering a depth map of the subject from a real camera perspective. According to an example embodiment, these depth maps may be used at 340 to generate views from the virtual camera. In addition, at 325, the procedure may include encoding the foreground frames and depth maps into a multi-view video.

As further illustrated in FIG. 15, at 330, the procedure may include determining a nearby real camera view. According to an example embodiment, the nearby real camera views may be used as inputs for view interpolation in further steps. In addition, at 335, the procedure may include decoding a color and depth frame of the selected view from the multi-view video. The procedure may also include, at 340, interpolating the selected views and performing rendering from the perspective of the new view. Further, at 345, the procedure may include fusing the interpolated views to form a 3D rendering of the new view, and at 350, displaying the fused frame.

Figure 16:
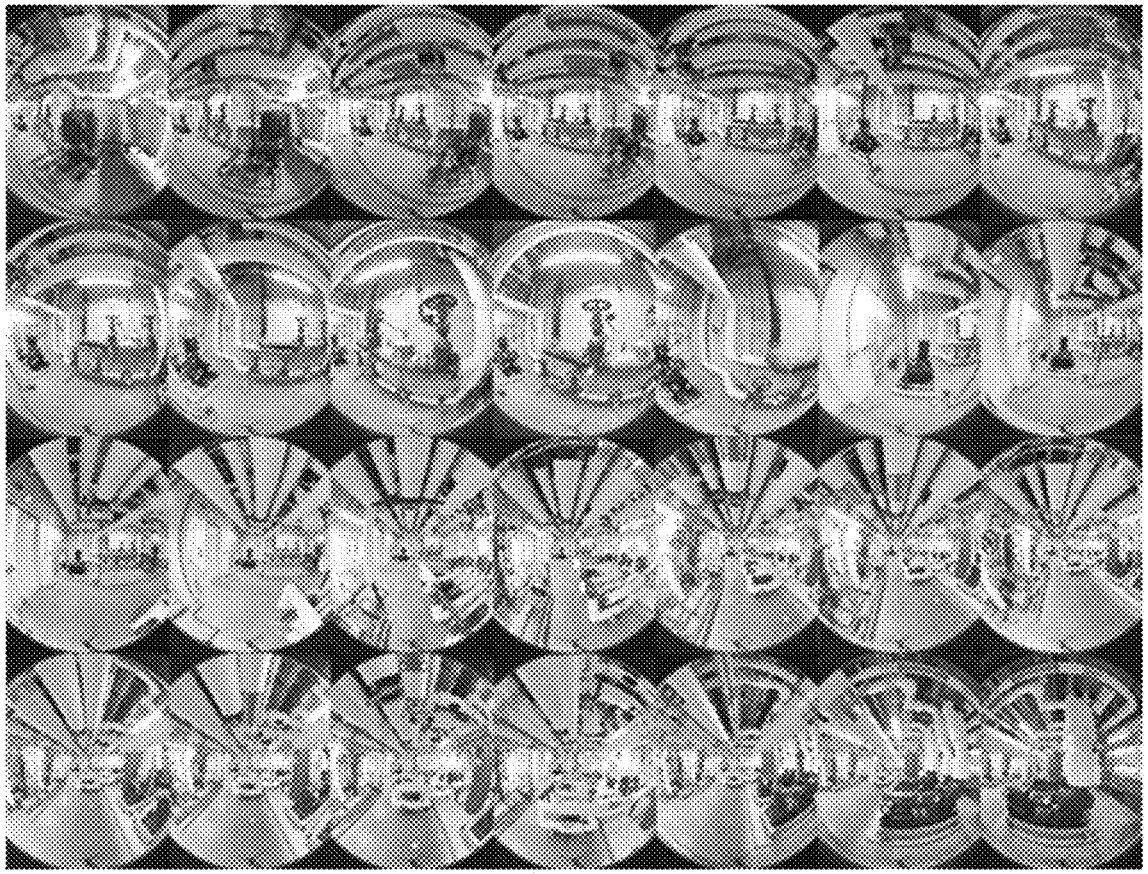
FIG. 16 illustrates a raw camera footage collage, according to an example embodiment.

FIG. 16 illustrates a raw camera footage collage, according to an example embodiment. For instance, FIG. 16 illustrates raw camera footage used to calibrate camera locations and estimate environment geometry. According to certain example embodiments, 360 images and videos may be non-interactive, but they may also produce realistic environments. On the other hand, real-time computer generated virtual environments (such as those found in video games) may be naturally interactive, but of lesser cinematic quality due to their computed nature. Moreover, certain example embodiments may add navigability to multiple viewpoint 360 cameras based virtual environments. For instance, as described herein, certain example embodiments may enable users to freely "teleport" between multiple 360 viewpoints as if they are moving through a captured 360 virtual environment.

To improve upon these 360 camera based navigable virtual environments, certain example embodiments may provide means to enable robust interactivity in these environments through the combination of captured 360 images/videos and real-time computer generated virtual objects. The improved virtual environment may join the cinematic quality of 360 camera based environment with the interactivity of 3D virtual environments. To achieve this, certain example embodiments provide a pipeline that estimates physical properties of the multi-view 360 camera captured scene such as 3D geometry of objects and relative position and orientation of viewpoints. The estimated values may be used to establish a correspondence between the multi-viewpoint 360 cameras captured scene and a virtual 3D space containing virtual objects.

Figure 17B:
FIG. 17(B) illustrates virtual objects inserted into the photorealistic 360 environment from a different view point, the location of the virtual objects relative to the environment appear consistent between view points, according to an example embodiment
Figure 17A:
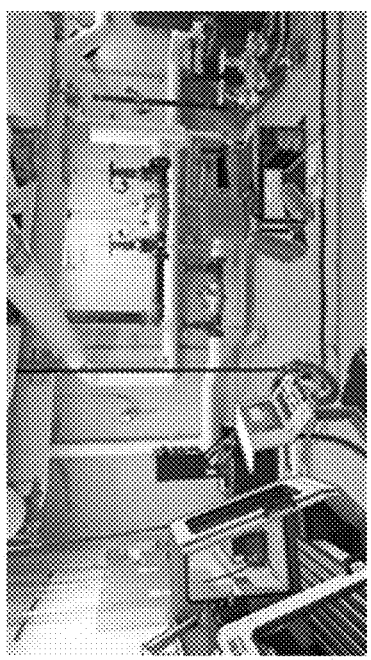
FIG. 17(A) illustrates virtual objects inserted into a photorealistic 360 environment from one view point, according to an example embodiment.

FIG. 17(A) illustrates virtual objects inserted into a photorealistic 360 environment from one view point, according to an example embodiment. In addition, FIG. 17(B) illustrates virtual objects inserted into the photorealistic 360 environment from a different view point from that of FIG. 17(A), the location of the virtual objects relative to the environment appear consistent between view points, according to an example embodiment. Both images in FIGS. 17A) and 17(B) may appear to cast shadows onto the floor in the 360 environment, which may represent an example of the lighting effects used to blend the virtual objects into the 360 scene.

According to other example embodiments, the virtual environment may be rendered and composited with the 360 image/videos. In an example embodiment, the established correspondence may be used to apply a positional and rotational transform to the virtual camera used to render the virtual objects so that the rendered objects appear to stay fixed in 3D space relative to the content of the camera captured scene at all 360 viewpoints locations. According to another example embodiment, color and lighting information about the 360 camera captured scene may be used to apply image based lighting to the virtual objects during rendering. In addition, lighting and 3D geometry information of the 360 camera captured scene may be used to simulate virtual objects casting shadows onto the camera captured scene. Further, information about the 3D geometry of the 360 camera captured scene may be used to simulate real-time physical interactions between virtual objects and the 360 camera captured scene. In one example embodiment, the geometry information may also be used to simulate occlusions between 360 camera captured scene and virtual objects. The end result may be a blended virtual environment where the 360 camera captured environment and the rendered virtual environment appear to the user as a single cinematic quality navigable virtual environment with rich interactivity.

According to certain example embodiments, a 360 image/video may represent a projection of a 3D scene onto a spherical 2D surface. After projection, information about the 3D geometry of the captured scene may be lost. When capturing a scene with multiple 360 viewpoints, information about the relative orientation and position among viewpoints may also be lost. As described herein, certain example embodiments provide a system that may use this information to combine a rendered virtual environment with the multi-view 360 camera captured environment into a blended virtual environment.

In certain example embodiments, input of the software calibration pipeline may be a set of images from the multi-view 360 camera captured data. According to an example embodiment, at least one image from each camera view may be needed to successfully calibrate cameras at all viewpoints. In an example embodiment, still images may be extracted from footage taken from each 360 camera viewpoint. The images may be unstitched sensor images from the individual camera lenses of a multi-camera array, or images rendered from a virtual camera using stitched 360 images.

According to an example embodiment, features may be detected in each input image. As described herein, the features may refer to distinct feature point(s) in an image (frames), and may be represented by feature descriptors that capture the relationship between a pixel and its neighbors. Further, distinct feature points from two different images (e.g., corners of a table) may be used to estimate camera position and orientation in a calibrated scene. In an example embodiment, these features may then be matched across input images. Additionally, camera poses for each image may be estimated by triangulating matched features from each image. In an example embodiment, a bundle adjustment technique may be used to minimize errors in the estimated camera poses and the triangulated image features. Furthermore, refined camera poses for each input image may be grouped by their source 360 viewpoint, and used to calculate a single camera pose for each 360 camera location. The refined triangulated image features may form a sparse 3D point cloud.

Figure 18:
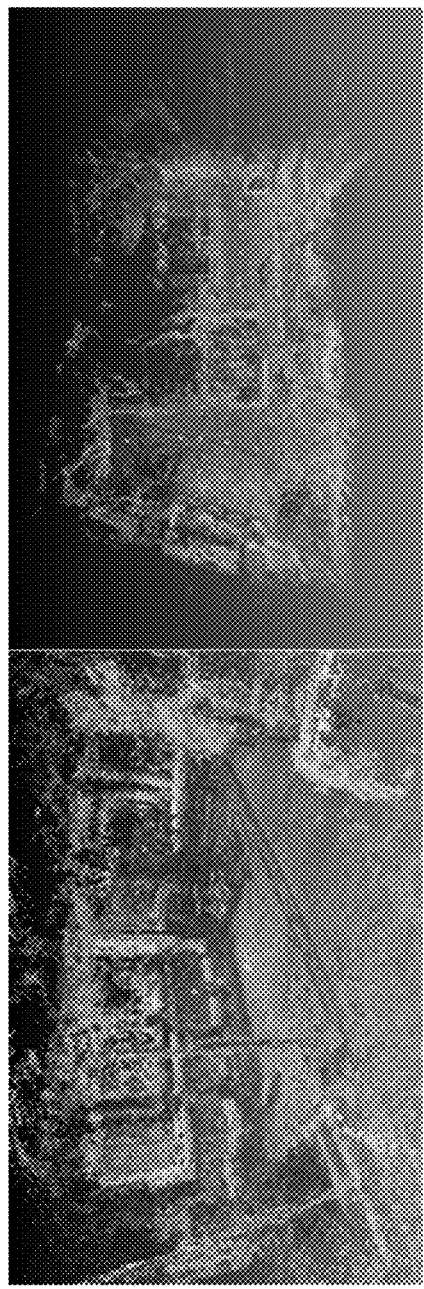
FIG. 18 illustrates a calibrated point cloud and estimated camera positions, according to an example embodiment.

FIG. 18 illustrates a calibrated point cloud and estimated camera positions, according to an example embodiment. For instance, FIG. 18 illustrates a calibrated point cloud and estimated camera positions using captured 360 footage. FIG. 18 also illustrates generation of a point cloud representing the 3D geometry of the captured environment, and camera positions that are calibrated in the same coordinate system. In an example embodiment, a point cloud densification algorithm may further refine the geometry, and estimate a denser version of the calibrated sparse point cloud.

Figure 19B:
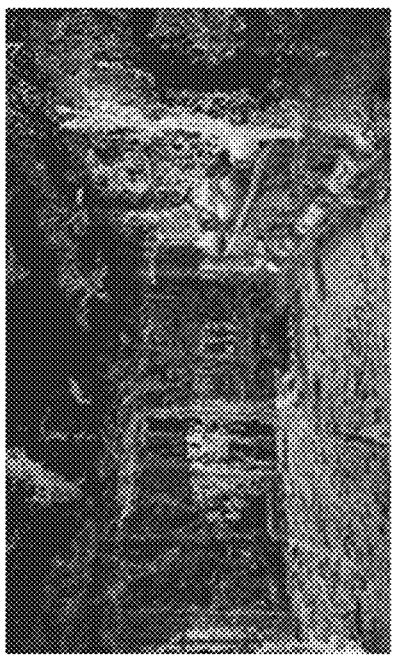
FIG. 19(B) illustrates a view from a reconstructed 3D point cloud of the 360 environment, according to an example embodiment.
Figure 19A:
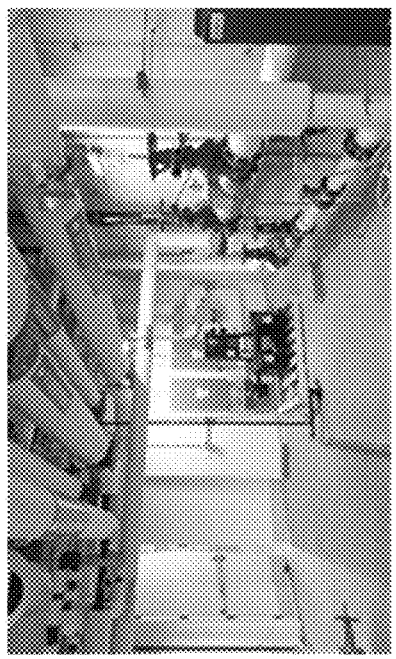
FIG. 19(A) illustrates a view from a 360 environment, according to an example embodiment.
Figure 19C:
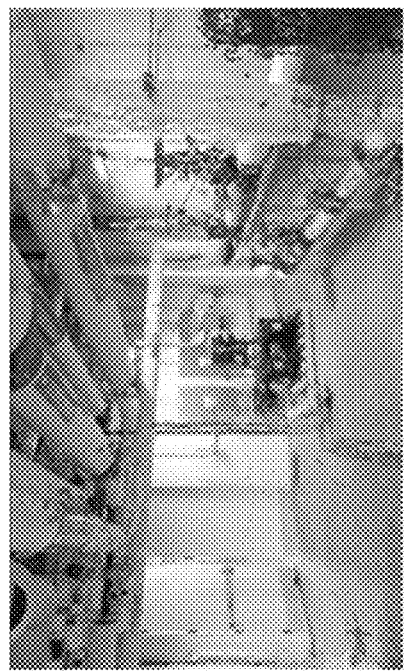
FIG. 19(C) illustrates a view from the 360 environment aligned with the reconstructed 3D point cloud of the 360 environment, according to an example embodiment.

FIG. 19(A) illustrates a view from a 360 environment, according to an example embodiment. For example, FIG. 19(A) may represent the view the user sees from that specific position at a specific viewing head orientation. In addition, FIG. 19(B) illustrates a view from a reconstructed 3D point cloud of the 360 environment, according to an example embodiment. In particular, FIG. 19(B) illustrates the same view as FIG. 19(A), except rendering the reconstructed 3D point cloud of the 360 environment. In an example embodiment, the 3D point cloud may be an estimation of the 3D geometry of the 360 environment. Further, FIG. 19(C) illustrates a view from the 360 environment aligned with the reconstructed 3D point cloud of the 360 environment, according to an example embodiment. For instance, FIG. 19(C) illustrates the point cloud being used to estimate the 3D geometry of the captured scene. In addition, FIG. 19(C) illustrates that the camera may be calibrated successfully, which may enable certain example embodiments to insert 3D objects into the 360 environment, and have the objects appear to actually be present in the 360 image/video.

According to another example embodiment, the output of the pipeline may include camera poses for each 360 view location and a dense point cloud. In certain example embodiments, camera poses may be used as input to calculate positional and rotational transforms to apply to the virtual camera that renders virtual objects. The dense point cloud may be used as an estimated 3D geometry of the captured scene, and this geometry may then used for shadow calculations, physical interaction calculations, and occlusion calculations.

According to certain example embodiments, physical interactions may be simulated. For instance, physical interactions may be simulated between virtual objects and objects from the 360 camera captured scene in the blended virtual environment. To do this, certain example embodiments may place special virtual objects that act as a physical proxy for objects contained in the 360 camera captured scene. The estimated 3D geometry from the calibration pipeline may be used to easily determine the correct shape, size, and position of the proxy virtual objects in the blended virtual environment. These proxy virtual objects may not be visibly rendered, and may be used by the physics engine to calculate collisions and interactions with other virtual objects.

According to an example embodiment, the physics engine may include a component of the software system that simulates physical interactions between virtual objects using 3D geometry and other physical properties. The physics engine may be a common component of interactive 3D computer software such as video games. For instance, in a game, if a virtual rubber ball collides with a wall, it may bounce off the wall, fall to the floor (due to gravity), and roll before stopping. According to an example embodiment, this interaction may be calculated by the physics engine.

In an example embodiment, when the rendered virtual objects and the 360 camera captured scene are composited, virtual objects interacting with the virtual proxy objects may appear to the user to be interacting with the corresponding objects from the 360 camera captured scene. For example, if a user in the blended virtual environment throws a virtual ball object at a wall from the 360 camera captured scene, the ball may interact with the wall's proxy geometry during physics calculations and appear to the user to collide with the wall.

Certain example embodiments may provide virtual object transformations, 360 sphere rotations, lighting and occlusion. With virtual object transformations, certain example embodiments provide the ability to create the effect that virtual objects and 360 camera captured objects are part of a single 3D space in the blended virtual environment. That is, in certain example embodiments, virtual objects and objects in the multi-viewpoint 360 camera captured scene may appear to the user to maintain the same relative position, orientation, and scale when the user navigates among different 360 viewpoints.

As previous noted, FIGS. 17(A) and 17(B) illustrate a photorealistic 360 environment, and virtual objects inserted therein viewed from different viewpoints. In the calibration step, the position and rotation of each 360 camera location in the multi-view 360 camera captured scene and a 3D point cloud of the scene's geometry are estimated. These points and camera transformations may be converted to the coordinate space of the virtual scene. During rendering, the position of the virtual camera which may be used to render virtual objects is set to the estimated 360 camera position of current 360 viewpoint of the user. According to an example embodiment, the virtual objects may be rotated in the virtual coordinate space by the estimated 360 camera rotation of the current 360 viewpoint (the same effect could be achieved by applying the inverse rotation to the current 360 video/image sphere). The resulting effect is that virtual objects and 360 camera captured objects in the blended virtual environment appear to move the same distance and keep the same relative rotation and scale when navigating among viewpoints.

In an example embodiment, to strengthen the illusion that the 360 camera captured scene and the virtual scene are a single cinematic blended virtual environment, lighting characteristics of the virtual objects may match the lighting of the 360 camera captured environment. To achieve this, one example embodiment may estimate the lighting properties in the 360 camera captured scene and use them to recreate the same lighting conditions when rendering virtual objects. One technique to achieve this may be to use the 360 image/video at the users' current viewpoint as a lighting source when lighting virtual objects. According to an example embodiment, the 360 image/video may be treated as a light sphere containing color information about the environment that surrounds the virtual objects. Further, color values from the 360 image/video may be sampled during lighting calculations when rendering each virtual object. Additionally, image based filtering (brightness change, gamma correction, blurring, thresholding, etc.) may be used to modify the light sphere to achieve better results.

Another example embodiment may provide a technique to increase apparent interaction between the 360 cameras captured objects, and virtual objects in the blended virtual environment. As illustrated in FIG. 17(B), shadows may from the virtual objects may land on the 360 camera captured environment. According to an example embodiment, increasing the apparent interaction may be done by casting shadows from virtual objects so that they appear to land on objects within the 360 camera captured scene. This can be done by creating shadow receiving virtual proxy objects in the virtual space. The geometry of the virtual proxy objects may be aligned with the geometry of the captured scene because of the prior estimation of 3D geometry of the 360 camera captured scene. In an example embodiment, when rendering virtual objects, the shadow receiving proxy objects may be invisible except in areas that receive shadows from the virtual objects. In these regions, the shadow receiving proxy objects may be given a chosen shadow color, and may be semi-transparent. In addition, when the 360 image/video is composited with the rendered virtual objects, these regions may create an illusion that objects in the 360 camera captured scene are receiving shadows from the virtual objects, and that the two are a single blended virtual environment.

In an example embodiment, an interactive environment may be characterized as one where a user's actions can change or update the state of the environment. In the blended virtual environment described herein, a user may directly influence the state of virtual objects in the environment. According to one example embodiment, virtual objects may appear to interact with the 360 camera captured environment through physical collisions, occlusions, and shadows. To enable the users actions to change or update the content of the 360 camera captured environment, one example embodiment may implement a branching mechanism that dynamically changes the 360 video/image displayed at a viewpoint. Similar to the process of updating the displayed 360 video/image when a user is navigating amongst 360 viewpoints, an example embodiment may update the 360 video/image displayed to the user based on the user's interactions in the blended virtual environment.

According to an example embodiment, certain user actions in the blended virtual environment may be set to trigger a narrative branch, where the internal state of the environment is updated and the 360 video/image displayed to the user updates to depict the influence of the action upon the environment. For example, if a user in the blended virtual environment picks up a virtual wrench and throws it in the direction of a door in the currently displayed 360 video/image, a collision with the door's proxy geometry can be detected and trigger a branch where the current 360 video is switched to a 360 video of the door opening. As another example, a user exclaiming "Open sesame!" into a microphone can trigger a branch where the current 360 video containing a door is switched to a 360 video of the door opening. As another example, a user pulling a virtual lever can trigger a branch where the current 360 video containing a door is switched to a 360 video of the door opening. The branch mechanism may increase the potential robustness of interactivity in the blended virtual environment, and add a mechanism for users to directly change the 360 captured portion of the blended environment.

Figure 20:
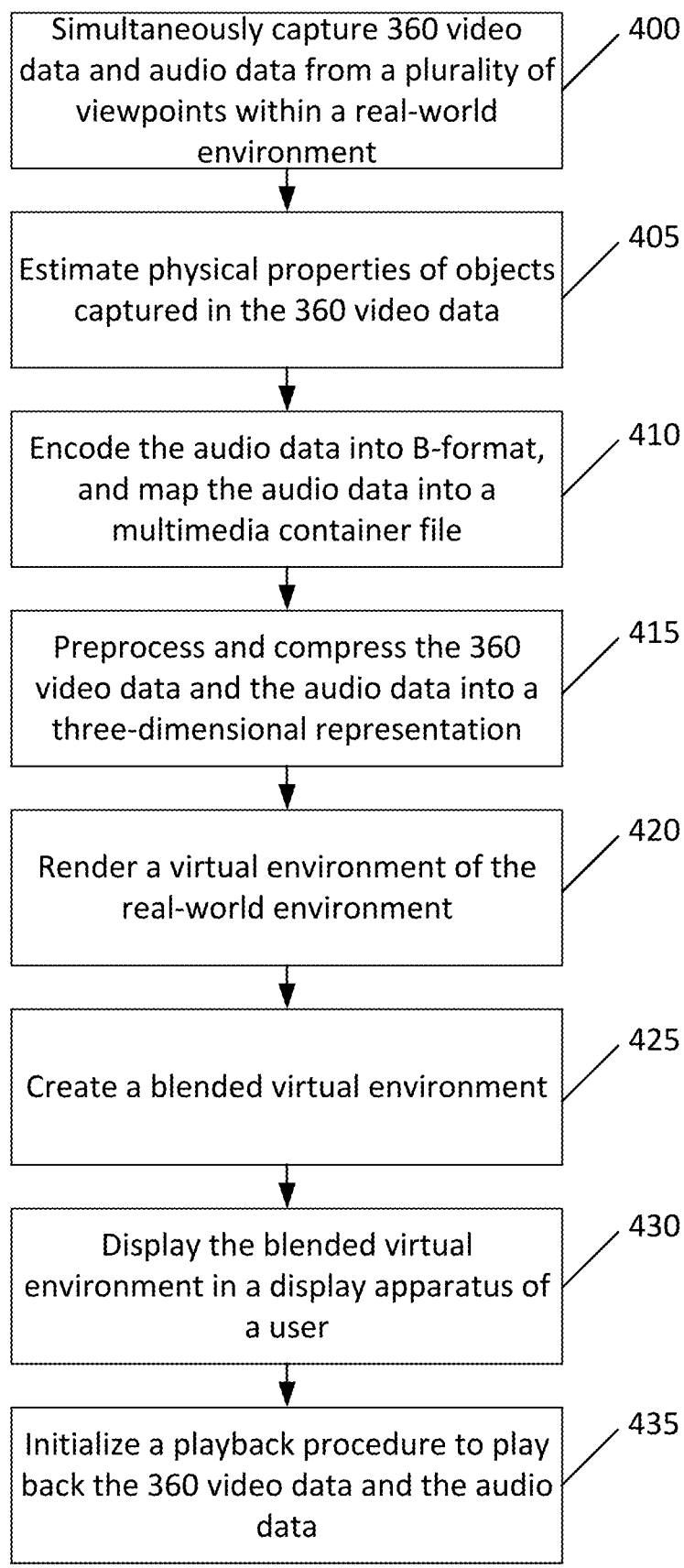
FIG. 20 illustrates a flow diagram of a method, according to an example embodiment.

FIG. 20 illustrates an example flow diagram of a method, according to an example embodiment. In certain example embodiments, the flow diagram of FIG. 20 may be performed by a desktop PC, mobile phone, VR headset, 360 camera, spatial audio recorder, workstation PC, GPU or other similar type devices/hardware, for instance similar to apparatus 10 illustrated in FIG. 21. According to one example embodiment, the method of FIG. 20 may include initially, at 400, simultaneously capturing 360 video data and audio data from a plurality of viewpoints within a real-world environment. The method may also include, at 405, estimating physical properties of objects captured in the 360 video data. The method may further include, at 410, encoding the audio data into B-format, and mapping the audio data into a multimedia container file. In addition, the method may include, at 415, preprocessing and compressing the 360 video data and the audio data into a three-dimensional representation suitable for display. The method may also include, at 420, rendering a virtual environment of the real-world environment, and at 425, creating a blended virtual environment by combining the captured 360 video data and the audio data with the rendered virtual environment. Further, at 430, the method may include displaying the blended virtual environment in a display apparatus of a user. In addition, at 435, the method may include initializing a playback procedure to play back the 360 video data and the audio data as a photorealistic navigable virtual environment to the user to recreate the appearance and sound of the real-world environment from a given viewpoint at a given orientation.

In an example embodiment, the three-dimensional representation may be rendered based on interpolated views of captured nearby camera views. In another example embodiment, the preprocessing and compressing may include utilizing multi-stream video encoding to create multi-view video textures for constructing the three-dimensional representation. According to an example embodiment, the preprocessing and compressing comprises implementing matching parameters including frame resolution and coding format. In another example embodiment, the virtual environment may be a virtual 360 environment. According to another example embodiment, the rendered environment may be a partial mesh representing the environment, or it may be virtual objects and holograms.

Figure 21:
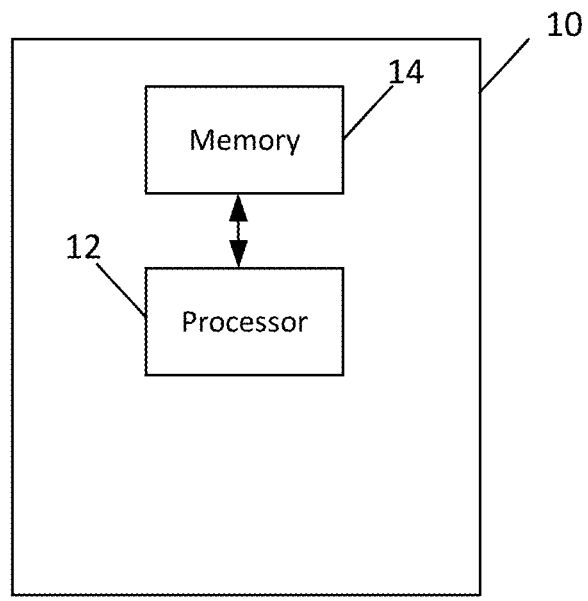
FIG. 21 illustrates an apparatus, according to an example embodiment.

FIG. 21 illustrates an apparatus 10 according to an example embodiment. In an embodiment, apparatus 10 may be a desktop PC, mobile phone, VR headset, 360 camera, spatial audio recorder, workstation PC, GPU, or other similar type devices/hardware, or a combination one or more of these devices/hardware elements.

In some example embodiments, apparatus 10 may include one or more processors, one or more computer-readable storage medium (for example, memory, storage, or the like), one or more radio access components (for example, a modem, a transceiver, or the like), and/or a user interface. It should be noted that one of ordinary skill in the art would understand that apparatus 10 may include components or features not shown in FIG. 21.

As illustrated in the example of FIG. 21, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 21, multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, encoding and decoding of individual bits forming a packet, formatting of information, and overall control of the apparatus 10, including processes illustrated in FIGS. 1-20.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-20, and described herein.

Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, processor 12 and memory 14 may be included in or may form a part of processing circuitry or control circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

Certain example embodiments described herein provide several technical improvements, enhancements, and/or advantages. In some example embodiments, it may be possible to break through the limitations of captured 360 navigable environments where the captured environments are of cinematic quality but not interactive. Users can explore a captured cinematic quality 3D environment containing virtual objects by navigating between multiple 360 viewpoints. Furthermore, by using image based lighting and shadows, virtual content and 360 camera captured content may be made difficult to differentiate. Using simulated physics and occlusion, 360 camera captured scene and the virtual scene may interact as a single physical space. These additional embodiments provide enhancements to dynamic photorealistic navigable virtual environments, and may increase the interactivity of the environments while also allowing the modification of camera captured environments through augmentation with custom virtual objects. Certain example embodiments may also open opportunities in creating interactive cinematic quality environments to be used in 3D virtual or augmented reality (VR/AR) platforms as well as traditional 2D displays.

According to certain example embodiments, it may also be possible to provide 360 video and audio recording pairs that are recorded simultaneously from different viewpoints within the same real-world environment. As such, certain example embodiments may provide the ability to switch between an arbitrary number of 360 videos with less overhead than a single 360 video. In other example embodiments, it may be possible to facilitate low latency seeking to allow instantaneous teleportation between viewpoints. According to anther example embodiment, it may be possible to decode from a random point in a bitstream with non perceivable latency. It may also be possible to reduce the amount of file objects that must be opened for reading during playback, and reduce the amount of file operation overhead when scaling to more viewpoints.

In other example embodiments, it may be possible to calculate and simulate direction audio at the location of recording. As such, the spatial audio may match the visuals in the 360 video as the user turns to a different viewing direction.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments.

PARTIAL GLOSSARY

HEVC High Efficiency Video Coding
I/O Input/Output
UI User Interface
VR Virtual Reality

We claim:
1. A method, comprising:
simultaneously capturing 360 degree video data and audio data from a plurality of viewpoints within a real-world environment;
preprocessing and compressing the 360 degree video data and the audio data into a three-dimensional representation suitable for display;
rendering a virtual environment of the real-world environment;
creating a blended virtual environment by combining the captured 360 degree video data and the audio data at multiple locations with the rendered virtual environment;
displaying the blended virtual environment in a display apparatus of a user; and
estimating physical properties of a plurality of objects, in multiple 360 degree video data, wherein the estimated physical properties of the plurality of objects in the multiple 360 degree video data are utilized to establish a correspondence between the plurality objects in the multiple 360 degree video data and physical and virtual objects in the blended virtual environment so that the physical and the virtual objects in the blended virtual environment have position, scale, and orientation that are consistent with the multiple 360 degree video data across multiple views,
wherein the captured audio data and the 360 degree video data are in time synchronization when navigating between the multiple locations and during display of the blended virtual environment, and
wherein during the time synchronization of the captured audio data and the 360 degree video data, time progresses continuously when navigating between the multiple locations.

2. The method according to claim 1, wherein the method further comprises initializing a playback procedure to play back the 360 degree video data and the audio data as a photorealistic navigable virtual environment to the user to recreate the appearance and sound of the real-world environment from a given viewpoint at a given orientation.

3. The method according to claim 1, wherein the three-dimensional representation is rendered based on interpolated views of captured nearby camera views.

4. The method according to claim 1, wherein the preprocessing and compressing comprises utilizing multi-stream video encoding to create multi-view video textures for constructing the three-dimensional representation.

5. The method according to claim 1, wherein the preprocessing and compressing comprises implementing matching parameters including frame resolution and coding format across content files representing each 360 degree viewpoint.

6. An apparatus, comprising:
at least one processor; and
at least one memory comprising computer program code, the at least one memory and the computer program code are configured, with the at least one processor to cause the apparatus at least to:

simultaneously capture 360 degree video data and audio data from a plurality of viewpoints within a real-world environment;

preprocess and compress the 360 degree video data and the audio data into a three-dimensional representation suitable for display;

render a virtual environment of the real-world environment;

create a blended virtual environment by combining the captured 360 degree video data and the audio data at multiple locations with the rendered virtual environment;

display the blended virtual environment in a display apparatus of a user; and estimate physical properties of a plurality of objects in multiple 360 degree video data, wherein the estimated physical properties of the plurality of objects in the multiple 360 degree video data are utilized to establish a correspondence between the plurality objects in the multiple 360 degree video data and physical and virtual objects in the blended virtual environment so that the physical and the virtual objects in the blended virtual environment have position, scale, and orientation that are consistent with the multiple 360 degree video data across multiple views, wherein the captured audio data and the 360 degree video data are in time synchronization when navigating between the multiple locations and during display of the blended virtual environment, and wherein during the time synchronization of the captured audio data and the 360 degree video data, time progresses continuously when navigating between the multiple locations.

7. The apparatus according to claim 6, wherein the at least one memory and the computer program code are further configured, with the at least one processor to cause the apparatus at least to initialize a playback procedure to play back the 360 degree video data and the audio data as a photorealistic navigable virtual environment to the user to recreate the appearance and sound of the real-world environment from a given viewpoint at a given orientation.

8. The apparatus according to claim 6, wherein the three-dimensional representation is rendered based on interpolated views of captured nearby camera views.

9. The apparatus according to claim 6, wherein the preprocessing and compressing comprises utilizing multi-stream video encoding to create multi-view video textures for constructing the three-dimensional representation.

10. The apparatus according to claim 6, wherein the preprocessing and compressing comprises implementing matching parameters including frame resolution and coding format across content files representing each 360 degree viewpoint.

11. A computer program, embodied on a non-transitory computer readable medium, the computer program, when executed by a processor, causes the processor to:

simultaneously capture 360 degree video data and audio data from a plurality of viewpoints within a real-world environment;

preprocess and compress the 360 degree video data and the audio data into a three-dimensional representation suitable for display;

render a virtual environment of the real-world environment;

create a blended virtual environment by combining the captured 360 degree video data and the audio data at multiple locations with the rendered virtual environment; and display the blended virtual environment in a display apparatus of a user; and estimate physical properties of a plurality of objects in multiple 360 degree video data, wherein the estimated physical properties of the plurality of objects in the multiple 360 degree video data are utilized to establish a correspondence between the plurality objects in the multiple 360 degree video data and physical and virtual objects in the blended virtual environment so that the physical and the virtual objects in the blended virtual environment have position, scale, and orientation that are consistent with the multiple 360 degree video data across multiple views, wherein the captured audio data and the 360 degree video data are in time synchronization when navigating between the multiple locations and during display of the blended virtual environment, and wherein during the time synchronization of the captured audio data and the 360 degree video data, time progresses continuously when navigating between the multiple locations.

12. The computer program according to claim 11, wherein the computer program, when executed by the processor, further causes the processor to initialize a playback procedure to play back the 360 degree video data and the audio data as a photorealistic navigable virtual environment to the user to recreate the appearance and sound of the real-world environment from a given viewpoint at a given orientation.

13. The computer program according to claim 11, wherein the three-dimensional representation is rendered based on interpolated views of captured nearby camera views.

14. The computer program according to claim 11, wherein the preprocessing and compressing comprises utilizing multi-stream video encoding to create multi-view video textures for constructing the three-dimensional representation.

* * * * *